United States Patent
Kato et al.

(10) Patent No.: US 8,138,895 B2
(45) Date of Patent: Mar. 20, 2012

(54) FORCE/TACTILE FEEDBACK DEVICE

(75) Inventors: Keisuke Kato, Tokyo (JP); Kenichiro Nagasaka, Tokyo (JP); Masakuni Nagano, Chiba (JP); Yasunori Kawanami, Tokyo (JP)

(73) Assignee: Sony Corporation, Tokyo (JP)

( * ) Notice: Subject to any disclaimer, the term of this patent is extended or adjusted under 35 U.S.C. 154(b) by 492 days.

(21) Appl. No.: 12/252,624

(22) Filed: Oct. 16, 2008

(65) Prior Publication Data

US 2009/0102620 A1    Apr. 23, 2009

(30) Foreign Application Priority Data

Oct. 19, 2007 (JP) ................................. 2007-272098
May 30, 2008 (JP) ................................. 2008-143764

(51) Int. Cl.
*H04B 3/36* (2006.01)

(52) U.S. Cl. ...................... 340/407.1; 345/163; 318/628

(58) Field of Classification Search ............... 340/407.1; 318/628, 2, 560; 345/163, 156
See application file for complete search history.

(56) References Cited

U.S. PATENT DOCUMENTS

| 5,382,885 | A | * | 1/1995 | Salcudean et al. | ........ 318/568.11 |
| 5,587,937 | A | * | 12/1996 | Massie et al. | ..................... 703/7 |
| 5,898,599 | A | * | 4/1999 | Massie et al. | ................. 345/161 |
| 6,042,555 | A | * | 3/2000 | Kramer et al. | ................. 600/595 |
| 6,088,020 | A | * | 7/2000 | Mor | ............................ 345/156 |
| 2001/0032090 | A1 | * | 10/2001 | Moneim | .......................... 705/1 |
| 2011/0032090 | A1 | * | 2/2011 | Provancher | ............... 340/407.1 |

FOREIGN PATENT DOCUMENTS

| JP | 2002-182817 A | 6/2002 |
| JP | 3329443 | 7/2002 |
| JP | 2003-323247 A | 11/2003 |
| JP | 2004-02999 A | 1/2004 |
| JP | 2007-510232 A | 4/2007 |

* cited by examiner

*Primary Examiner* — George Bugg
*Assistant Examiner* — Edny Labbees
(74) *Attorney, Agent, or Firm* — Wolf, Greenfield & Sacks, P.C.

(57) ABSTRACT

A force/tactile feedback device feeding back a force sense to a fingertip of an operator includes a fingerstall to which the fingertip of the operator is inserted, a position feedback means for feeding back a position to the fingertip held by the fingerstall, a fingertip contact point feedback means for feeding back a fingertip contact point to the fingertip held by the fingerstall and an unnecessary moment removal means for supporting the fingertip contact point feedback means so that unnecessary moment is not generated at a tip portion of the position feedback means.

14 Claims, 19 Drawing Sheets

FORCE/TACTILE FEEDBACK DEVICE

CROSS REFERENCE TO RELATED APPLICATIONS

The present invention contains subject matter related to Japanese Patent Applications JP 2007-272098 and JP 2008-143764 filed in the Japanese Patent Office on Oct. 19, 2007 and May 30, 2008, respectively, the entire contents of which being incorporated herein by reference.

BACKGROUND OF THE INVENTION

1. Field of the Invention

The invention relates to a force/tactile feedback device for feeding back a force sense or a tactile sense to an operator in a simulation space in which physical environment is exquisitely calculated, a simulation space in which physical environment is artificially or simply calculated or in an actual physical space in a master/slave relationship, particularly, relates to a force/tactile feedback device feeding back a gripping sense to fingertips of the operator.

More particularly, the invention relates to a force/tactile feedback device feeding back the force sense to fingertips of the operator as well as feeding back a shape by driving of plural finders, particularly, relates to a force/tactile feedback device not only feeding back the force sense or the tactile sense with respect to a fixed contact point but also feeding back a position of the contact point on which a contact state is reflected.

2. Description of the Related Art

In a technical field of virtual reality or telereality, a force sense display, namely, "haptic device" for feeding back a force sense or a tactile sense to the operator in addition to visual information and hearing information is indispensable.

Along with the improvement of computer speed and the progress of a simulation technology, virtual environment in which plural objects exist and physical interaction such as crashes or contacts occurs between them can be simulated in actual time. When a crash between objects or a contact force at that time can be calculated exquisitely as well as in actual time in consideration of dynamics, senses when the user touches or grips objects in the virtual environment through the haptic device can be fed back to the user with reality by actually generating the calculated force by an actuator such as a motor.

Applications of the haptic device are wide, which are used for feeding back a force sense or a tactile sense to the operator in the simulation space in which physical environment is exquisitely calculated, the simulation space in which physical environment is artificially or simply calculated or in the actual physical space in the master/slave relationship. Specifically, in learning of special skills such as medical care or the like, virtual environment such as microcosms or oceans, and remote operations in special or dangerous environment such as a nuclear reactor, a three-dimensional force or tactile sense with respect to objects in environment which are difficult to be actually touched can be fed back. According to scale or accuracy of the virtual space which can be processed in actual time, increase of demand of the force display in the future is expected.

For example, a pen-type haptic device using serial links as shown in FIG. 18 is common. The user grips a tip portion of the pen shape, in which 3-axial force to 6-axial force moment is fed back (for example, refer to JP-T-2007-510232 (Patent Document 1), http://www.sensable.com/haptic-phantom-desktop.htm (as of H19, October 9) (Non-Patent Document 1)). The haptic device in the drawing includes an operation system such that the operator just has a pen (or a probe), having a structure in which a 3 degrees of freedom arm and 3 degree of freedom gimbal are connected so that an arbitrary space position and the moment are fed back with respect to a specific portion such as a pen tip. According to such kind of device, a translation force and the moment can be generated at an arbitrary position in principle, however, a sense to be obtained is as if picking with the pen because the operation system by probing is a keynote, which does not give a sense of gripping the object.

A haptic device feeding back 3-axial force to 6-axial force moment by using a parallel link structure is proposed as a structure for solving lack of stiffness of the serial link as shown in FIG. 19 (for example, refer to Japanese Patent No. 3329443 (Patent Document 2), http://forcedimension.com/fd/avs/home/products/ (as of H19, October 9) (Non-Patent Document 2), http://www.quanser.com/industrial/html/products.fs_5dof.asp (as of H19, October 9) (Non-Patent Document 3)).

In any of the above haptic devices using the link mechanisms, a force sense is fed back with respect to one point of a gripping position, in other words, the force sense is not fed back to respective fingers of an operator independently. Accordingly, there is a problem that it is difficult to feed back the sense of gripping a virtual object by fingers.

As functions of the haptic device, a force sense feeding back force itself, a tactile sense feeding back a contact state can be cited. It goes without saying that a moving tactile sense usually performed by a human being is included. In order to realize these functions, not only force control ability which is necessary for haptics but also position feeding back ability reflecting a shape of a physical object, further, excellent response, namely, speed and acceleration control ability are necessary for realizing the moving tactile sense. There is also a method that the force sense is sharpened by the pen (probe) type and the like. However, in order to know the shape of the physical object, it is natural that there are plural contact points as in the case of grasping the object by plural fingers.

For example, a multi-finger type haptic device has an advantage that the shape of a target object can be fed back by driving of plural fingers. A slave hand such as a robot hand is applied to a master hand which performs remote operation, thereby having a function that the motion of the master hand (operation means) is transmitted to the slave hand (work means) as well as a force sense of the slave hand is fed back to the master hand. That is, an operator of the master side can obtain the sense as if performing operation directly to an operation target. According to the multi-finger type haptic device, it is possible to feed back a force sense to operator's fingers as well as to feed back the shape by driving of plural fingers.

In order to feed back the force to plural fingers, as shown in FIG. 20, a haptic device in which fingers and remote motors are connected by wire and the force is applied to respective fingers through the wire is proposed (for example, refer to http://sklab-www.pi.titech.ac.jp/frame_index-j.html (as of H19, October 9) (Non-Patent Document 4)). However, it is necessary to control so that the wire is not slackened, which may complicate the control. In addition, the interference between wires is liable to occur, particularly, the range in which the device can move concerning rotation is not so wide.

A haptic device in which a hand-type force feedback mechanism is added to an opposed manipulator as shown in FIG. 21 is also proposed (for example, refer to "opposed-multi fingers haptic interface" attributed to KAWASAKI Haruhisa, HORI Takumi and MOURI Tetsuya (Journal of the Robotics Society of Japan Vol. 23, No. 4, pp 449-456, 2005) (Non-Patent Document 5)). As a method similar to this, a method of adding a hand-type force feedback mechanism to tips of an exoskeleton is also proposed (for example, refer to http://www.immersion.com/3d/products/cyber_grasp.php (as of H19, October 9) (Non-Patent document 6)).

A method in which a fingerstall is provided at a tip of the serial link to feed back 3-axial force to a finger is also proposed.

For example, there is also proposed a force sense feedback device in which a 6-axial force sensor including a fingerstall into which a finger of a human being is inserted, a finger cover touching an object and an elastic structure which is between the fingerstall and the finger cover, to which a strain gauge is adhered, is connected to a base through a small manipulator (for example, refer to JP-A-2002-182817 (Patent Document 3)). According to the force sense feedback device, a force sense is fed back to fingertips of a human being as well as force sense data when a human being actually touches an object can be recorded/played back.

Additionally, there is proposed a tactile sense/force sense feedback system including a pair of real gloves which is worn on hands (fingers) of a user, giving a tactile sense (a touching sense, for example, distribution of touching intensity such as quality, shape or strength) or a force sense (sense of force added at the time of touching) to the hands or respective fingers on which the gloves are worn (refer to JP-A-2003-323247 (Patent Document 4)), in which tactile sense generation units are provided respectively at positions covering fingertip portions from first joints (a joint between a distal phalanx and a middle phalanx) of respective fingers of the user.

Also, there is proposed a force display hand including an elastic expansion/contraction structure in which plural skeleton materials are connected by connecting portions so as to move as well as fixed among plural skeleton materials over the connecting portions, further including fingerstalls or a glove connected to the skeleton materials as well as engaged to at least fingers, a palm or a part of a hand including a back of the hand, which gives an artificial force to the part of the hand by expanding or contracting the elastic expansion/contraction structure (for example, refer to JP-A-2004-29999 (Patent Document 5)).

However, in any of above related arts concerning the multi-finger type haptic devices, only translation force is fed back to fingertips, and it is difficult to feed back contact points of respective fingertips, namely, points of action. Therefore, it is difficult to feed back the gripping sense to plural fingertips in a good state.

It is important to directly touch an object by fingers of a human being for obtaining a contact sense clearly. In this light, a force/tactile feedback device capable of acquiring contact point information by an operator by allowing fingertips to touch spherical protrusions and by changing positions thereof is proposed (for example, refer to http://telerobotics.stanford.edu/publications/Provancher03-ISRR-Perception.pdf (as of H19, October 9) (Non-Patent Document 7), http://bdml.stanford.edu/twiki/bin/view/Haptics/ContactLocationDisplay (as of H19, October 9) (Non-Patent Document 8)). The device is configured to clearly feed back positions of contact points by rolling rollers which touch the fingertips of the operator directly, whereby the operator obtains contact sense more sensitively. However, the rollers for feeding back contact points touch the fingers at any time, therefore, unnecessary contact information is transmitted to the operator when the rollers move even when a force to be fed back is not generated. In addition, the operator senses the contact more sensitively because of the direct contact, therefore, the operator feels odd more sensitively.

SUMMARY OF THE INVENTION

In order to feed back a force sense and a contact sense most exquisitely, it is necessary to feed back three-translation degrees of freedom and three-rotation degrees of freedom, however, when actuators are arranged at all axes, a force/tactile feedback device is liable to be mechanically complicated, as a result, the degree of freedom in the vicinity of fingertips is of a concern.

At this time, when torque of actuators is used for not only compensation of gravity but also compensation of inertial force, force which can be practically fed back is reduced or there is a great deal of probability that transition characteristics will deteriorate.

When a mechanism in which the rotation center (contact point) is consistently fixed is used in a multi-finger haptic device, orientations of respective fingers are changed with respect to an object to be gripped. That is, it is difficult to reflect the change even in a state in which the contact points might be changed, therefore, a force sense to be fed back will be changed to odd feeling for the operator.

In an operation state which is far from gripping such as the pen type or the grip type, it seems that the odd feeling caused by the fact that the change of the contact points is not appropriately reflected does not become a problem. However, when a force sense and a contact sense are tried to be fed back by using plural fingers more exquisitely, the problem rather tends to be serious.

Thus, it is desirable to provide an excellent force/tactile feedback device which is capable of suitably feeding back a force sense or a tactile sense to an operator in a simulation space in which physical environment is exquisitely calculated, a simulation space in which physical environment is artificially or simply calculated or in an actual physical space in a master/slave relationship.

It is also desirable to provide an excellent force/tactile feedback device which is capable of feeding back the force sense to fingertips of the operator as well as feeding back a feeling of grasping an object and a shape of the grasped object by driving of plural finders.

It is still desirable to provide an excellent force/tactile feedback device not only feeding back the force sense or the tactile sense with respect to a fixed contact point but also feeding back a position of the contact point on which a contact state is reflected.

According to an embodiment of the invention, there is provided a force/tactile feedback device feeding back a force sense to a fingertip of an operator, including a fingerstall to which the fingertip of the operator is inserted, a position feedback means for feeding back a position to the fingertip held by the fingerstall, a fingertip contact point feedback means for feeding back a fingertip contact point to the fingertip held by the fingerstall and an unnecessary moment removal means for supporting the fingertip contact-point feedback means so that unnecessary moment is not generated at a tip portion of the position feedback means.

In a technical field such as virtual reality or telereality, a haptic device for feeding back a force sense and a tactile sense to the operator is indispensable in addition to visual information and acoustic information. For example, a multi-finger type haptic device can give a sense as if the operator directly operates on a target object, namely, grasping the object. However, all of the techniques of related arts concerning the above multi-finger haptic device can only feed back translation force to fingertips, and contact points of respective fingers, namely, points of action are not be fed back. Accordingly, it is difficult to feed back a grasping sense to plural fingers suitably.

It is necessary to feed back both three translation degrees of freedom and three rotation degrees of freedom in order to feed back a force sense and a touch sense exquisitely, however, if actuators are arranged at all axes, the force/tactile feedback device becomes complicated and the degree of freedom near the fingertips comes to be of concern.

When a mechanism in which a contact point of the fingertip is consistently fixed is used in the multi-finger haptic device, even in a state in which the orientation of respective fingers changes with respect to the object to be gripped, it is difficult to reflect the change, therefore, the fed-back force/tactile is changed to odd feeling.

In response to this, the force/tactile feedback device according to an embodiment of the invention reduces the active degree of freedom for one finger per unit as well as feeds back a position of a contact point according to a contact state of the fingertip when feeding back a force sense or a tactile sense at the contact point.

A force/tactile feedback device according to an embodiment of the invention is one unit for one finger, which basically includes a 3 degree-of-freedom position feedback arm, a 3 degree-of-freedom gimbal mechanism, a 1 degree-of-freedom contact point feedback arm and a fingertip portion holding mechanism of more than 1 degree-of-freedom. Among them, 3 degree-of-freedom of the position feedback arm and 1 degree-of-freedom of the fingertip portion holding mechanism are active degrees of freedom. That is, the force/tactile feedback device configured for one finger has four active degrees of freedom and three passive degrees of freedom, which reduces the active degree of freedom per a unit, as a result, it is easy to design a multi-finger type force/tactile feedback device. Then, units for respective fingers are combined, thereby forming the multi-finger type force/tactile feedback device as well as increasing operational feeling through the feedback of appropriate force sense or touch sense for an operator, which reduces fatigue of the operator due to the odd feeling on operation.

The position feedback means includes a serial-link type arm of a basic 3 degree-of-freedom drive system, and the fingertip contact-point feedback means includes a fingertip contact point drive shaft arranged on the fingerstall, a small arm an end of which is supported at the fingertip contact point drive shaft so as to pivot and a fingertip contact point provided at the other end of the small arm. The unnecessary moment removal means supports the small arm at a fingertip contact point feedback shaft so that the tip portion of the arm forming the position feedback means can pivot around the fingertip contact point.

The fingertip contact point drive shaft has an active fingertip contact-point feedback degree of freedom which is driven by an actuator, in which a fingertip contact point moves along the surface of a ball of a finger by pivoting movement of the small arm about the fingertip contact point drive shaft due to the driving of the fingertip contact point drive shaft. Therefore, the active fingertip contact-point feedback degree of freedom by the fingertip contact point drive shaft is controlled, thereby determining a contact point position of the ball of the fingertip in the fingerstall. Accordingly, a force sense as if the contact point has been changed at the fingertip can be given to the operator.

In addition, the unnecessary moment removal means is formed by a 3 degree-of-freedom gimbal which is arranged so that three axes of yaw, roll and pitch are orthogonal to one another and cross at one point as well as the intersection corresponds to the fingertip contact point. It is assembled so that any one of 3 axes is coaxial with the fingertip contact point feedback shaft. According to the 3 degree-of-freedom gimbal, the orientation of the fingertip can be changed around the fingertip contact point. Therefore, there is no offset between the contact point and a point of action when a force sense is given through the fingerstall, which is different from the case in which the contact point of the fingertip is fixed, and unnecessary moment is not generated. Since odd feeling on operation is not given to the operator, fatigue of the operator can be reduced.

An angle sensor measuring an angle of each axis is provided at the gimbal, which can measure the orientation of the fingertip contact point.

As already described, four degrees of freedom which are the basic 3 degree-of-freedom drive system and the fingertip contact point drive shaft are active degrees of freedom, and three degrees of freedom of the gimbal including yaw, roll (coaxial with the fingertip contact point feedback shaft) and pitch are passive degrees of freedom. That is, the active degree of freedom for one finger per one unit is saved, therefore, the mechanism is simplified and the device design becomes simple, as well as the weight near the fingertips is reduced. In the case that the multi-finger force/tactile feedback device is formed by combining units for plural fingers, interfere hardly occurs between adjacent fingers when the operator performs operation, which expands the movable range.

The force/tactile feedback device according to an embodiment of the invention can further include an orientation holding degree of freedom which does not change the orientation with respect to the fingertip contact point feedback shaft and the global coordinate system of the gimbal regardless of the orientation of the arm.

If the orientation holding degree of freedom is not included, when the multi-finger type force/tactile feedback device is formed by combining units for respective fingers and is operated while keeping the interval between respective fingers, there is a fear that the gimbals interfere with each other according to the change of the orientation with respect to the fingertip contact point feedback shaft and the orientation global coordinate system of the gimbal. In response to this, the force/tactile feedback device according to an embodiment of the invention has the orientation holding degree of freedom, therefore, even when operated while keeping the interval between respective fingers, orientations of roots of the gimbals are maintained according to the orientation holding degree of freedom, therefore, mutual interference hardly occurs between adjacent units, as a result, it is possible to expand the space in which respective units can be operated.

As already described, the position feedback means is formed by the serial-link type arm of the basic 3 degree-of-freedom drive system, having three active degrees of freedom. An indirect drive system can be applied to the driving these active degrees of freedom. For example, the serial-link type arm is supported by a given base at a root portion at an end, respective actuators for realizing the active degrees of freedom are arranged at the root portion of the serial link in a concentrated manner, thereby suppressing self interference and inertia moment of a drive portion itself.

The power generated by respective actuators arranged at the root portion can be transmitted to a corresponding joint with little loss by using, for example, a wire-pulley system power transmission means. In this case, it is preferable to include a wire tension adjustment means for maintaining sufficient tension of wire.

It is also preferable that a spiral pulley is used at basic drive system drive portions, namely, at joints, which are destinations of power to be transmitted by the power transmission means. The spiral pulley is a mechanism component in which grooves having cross-section of an approximately V-shape are formed spirally, and wire is wound on the V-shape grooves plural times, thereby increasing the tension of wire in the basic drive system drive portions, reducing a backlash and enabling sufficient transmission of drive torque. According to the spiral pulley, it is also possible to secure the number of wining wire in saved space.

The position feedback means can also apply a wire coupled drive mechanism which couple drives plural joints by plural actuators for the driving of the basic 3 degree-of-freedom. In the wire coupled drive system, one end of each wire is wound on a pulley united with the joint portion of the link member forming the arm and the other end is fixed at an output shaft of the actuator. The wire for driving the link member at the tip side connects between the joint portion and the output shaft of the actuator through the joint portion pulley at the root side.

In the wire coupled drive system, the joint portion pulley at the root side receives coupling from wire connected to the joint portion pulley at the tip side in addition to the wire of itself. That is, the joint portion pulley at the root side is driven by the total of tension obtained by all wires wound on the pulley itself, as a result, large torque can be obtained at the link portion of the root side, which enables the operation with a smaller actuator.

According to the embodiments of the invention, an excellent force/tactile feedback device can be provided, which is capable of feeding back a force sense to a fingertip of an operator as well as capable of feeding back a sense of grasping an object and a shape of an object by driving of plural fingers.

Also according to the embodiments of the invention, an excellent force/tactile feedback device can be provided, which is capable of not only feeding back a force sense or a tactile sense with respect to a fixed contact point but also feeding back a position of a contact point on which a contact state is reflected.

According to the embodiments of the invention, in either case that a target to which the force/tactile is fed back is in a virtual physical/force sense simulation space or in actual space, a suitable force sense and a contact sense are fed back to the operator, thereby increasing the operational feeling for the operator, avoiding a dangerous contact state (or gripped state) with respect to a target object as well as reducing fatigue of the operator due to odd feeling on operation.

The force/tactile feedback device according to the embodiments of the invention may include a position feedback means formed by a serial-link type arm of a basic 3 degree-of-freedom drive system supported on a given base, in which respective actuators for realizing active degrees of freedom are arranged at a root portion of the serial link in a concentrated manner to thereby suppress self interference or inertia moment of the drive portion itself.

The power is transmitted to respective joint portions arranged at the root portions from respective actuators by using a wire pulley system power transmission means, in which a spiral pulley is used at a tip portion to thereby fix the wire at the joint portion as well as a wire tension adjustment means is used to maintain sufficient tension of the wire to thereby reduce a backlash as much as possible and transmit sufficient drive torque.

It is also preferable that a wire coupled drive mechanism is applied for driving the basic 3 degree-of-freedom drive system as the position feedback means. According to the wire coupled drive system, a joint portion pulley of the root side is driven by the total of tension obtained from all wires wound around the pulley, therefore, larger torque can be obtained at a link portion at the root side, which enables the operation by a smaller actuator.

Further other characteristics and advantages of the invention will become clear by more detailed description based on later-described embodiments or attached drawings.

BRIEF DESCRIPTION OF THE DRAWINGS

FIG. 6 is operated;

FIG. 6 is operated;

FIG. 6 is operated;

FIG. 6 is operated;

FIG. 6 is operated;

FIG. 6 is operated;

DESCRIPTION OF THE PREFERRED EMBODIMENTS

Figure 1:
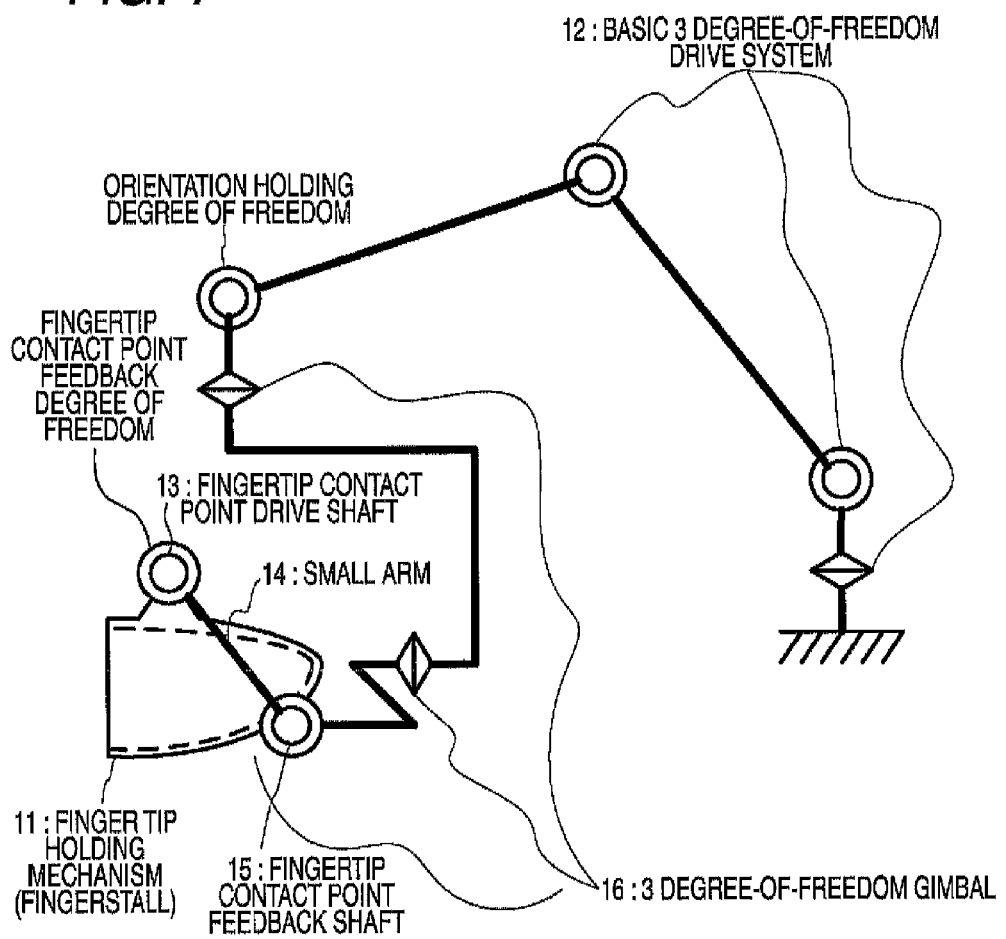
FIG. 1 is a view conceptually showing a configuration of degrees of freedom of a force/tactile feedback device according to an embodiment of the invention.

Hereinafter, embodiments of the invention will be described in detail with reference to the drawings.

The invention relates to a force/tactile feedback device feeding back a force sense or a tactile sense to an operator. The present inventors considers that, in either case that a target to which force/tactile is fed back is in a virtual physical/force sense simulation space or in an actual space, an appropriate force sense or a touch sense is fed back to the operator, thereby increasing operational feeling for the operator and avoiding a dangerous contact state (or gripping state) with respect to a target object as well as reducing fatigue of the operation due to odd feeling on operation.

As functions of the haptic device, in addition to a force sense feeding back force itself, a tactile sense feeding back a contact state can be cited. It goes without saying that moving tactile sense usually performed by a human being is included. In order to realize these functions, not only force control ability which is necessary for haptics but also position feedback ability reflecting a shape of a physical object, further, excellent response, namely, speed and acceleration control ability for realizing moving tactile sense are necessary. There is also a method that the force sense is sharpened by a pen (probe) type and the like. However, in order to know the shape of the physical object, it is natural that there are plural contact points. For example, a multi-finger type haptic device has an advantage that the shapes of the physical object can be fed back by driving of plural fingers.

Most of multi-finger type force/tactile feedback devices in related art are only capable of feeding back translation force to fingertips, and it is difficult to feed back contact points of respective fingertips, namely, points of action, therefore, it is difficult to feed back a gripping sense to plural fingertips in a good state. In order to feed back a force sense and a touch sense more exquisitely, it is necessary to feed back three translation degrees of freedom and three rotation degrees of freedom, however, a mechanism of the device becomes large in size with the increase of the active degree of freedom, the degree of freedom in the vicinity of fingertips such as interference between adjacent fingers is concerned. When a mechanism in which contact points of fingertips are consistently fixed is used, it is difficult to feedback change of orientations of respective fingers with respect to an object to be gripped, which gives odd feeling or fatigue with the operation to the operation.

On the other hand, a force/tactile feedback device according to an embodiment of the invention reduces the active degree of freedom for one finger per one unit as well as feeds back a position of a contact point according to the contact state of a fingertip when the force sense or the tactile sense at the contact point is fed back.

The force/tactile feedback device according to an embodiment of the invention has a structure as one unit for one finger, which includes four active degrees of freedom and three passive degrees of freedom, basically having a 3 degree-of-freedom position feedback arm, a 3 degrees of freedom gimbal mechanism, a 1 degree-of-freedom contact point feedback arm and a fingertip portion holding mechanism of more than 1 degree-of-freedom. Then, units for respective fingers are combined, thereby forming the multi-finger type force/tactile feedback device as well as increasing operational feeling through the feedback of the suitable force sense and the touch sense to the operator, which reduces fatigue of operator due to odd feeling on operation.

FIG. 1 conceptually shows a structure of degrees of freedom of the force/tactile feedback device according to an embodiment of the invention. The drawing is one unit for one finger, and the multi-finger type force/tactile feedback device can be formed by combining units for respective fingers. In the following explanation, an example in which a force sense is fed back with respect to three fingers of a thumb, a forefinger and a middle finger in a hand of an operator is cited.

A unit 10 in the drawing includes a fingerstall 11 to which a fingertip of an operator is inserted and held therein, a position feedback unit which feeds back a contact point position in space and a force to the fingertip held by the fingerstall 11, a fingertip contact point feedback unit which is attached to a tip portion of the position feedback unit and feeds back a fingertip contact point to the fingertip held by the fingerstall 11 and an unnecessary moment removal unit which supports the fingertip contact point feedback unit so that unnecessary moment is not generated at the tip portion of the arm forming the position feedback unit.

In the drawing, the position feedback unit includes a serial-link type arm which is operated by a basic 3 degree-of-freedom drive system 12, which is supported by a given base at a root portion of an end thereof. Respective degrees of freedom at joints which drive the arm have three active degrees of freedom driven by an actuator (not shown). However, the gist of the invention is not limited to the serial-link type basic 3 degree-of-freedom drive system, but can be substituted by mechanisms such as another link having the equivalent degree of freedom.

The fingertip contact point feedback unit includes a small arm 14 one end of which is supported at a fingertip contact point drive shaft 13 on the fingerstall 11 so as to pivot and a fingertip contact point provided at the other end of the small arm 14. The fingertip contact point drive shaft 13 is arranged at a portion corresponding to a back of a fingertip held of the fingerstall 11 and the fingertip contact point is arranged at a portion corresponding to a ball of the fingertip. A fingertip contact point feedback shaft 15 includes a rotation degree of freedom about the fingertip contact point. The fingertip contact point drive shaft 13 has an active fingertip contact-point feedback degree of freedom driven by an actuator (not shown), the fingertip contact point moves along a surface thereof while abutting on the ball of the finger by pivoting movement of the small arm 14 about the fingertip contact point drive shaft by the driving of the fingertip contact point drive shaft 13. Accordingly, the fingertip contact point feedback degree of freedom by the active fingertip contact point drive shaft 13 is controlled, thereby determining a contact point of the ball of the fingertip in the fingerstall 11. Then, a force sense as if the contact point has been changed at the fingertip can be given to the operator.

Figure 2:
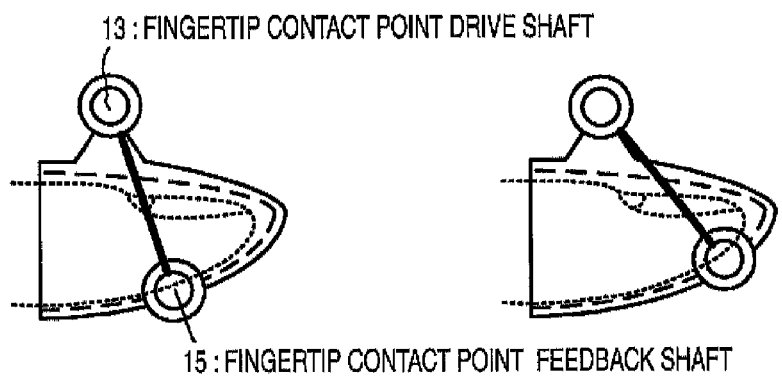
FIG. 2 is view showing a state in which a fingertip contact point moves along the surface of a ball of a finger by pivoting movement of a small arm about a fingertip contact-point drive shaft by the driving of the fingertip contact point drive shaft.

FIG. 2 shows a state in which the fingertip contact point moves along the surface of the ball of the finger by the pivoting movement of the small arm 14 about the fingertip contact point drive shaft by the driving of the fingertip contact point drive shaft 13. However, in the drawing, the simplest drive system approximating to an arc is shown.

The unnecessary moment removal unit supports the small arm 14 by the fingertip contact point feedback shaft 15 so as to pivot about the fingertip contact point at the tip portion of the arm forming the position feedback unit. In the example shown in FIG. 1, the unnecessary moment unit includes a gimbal 16 having 3 degree-of-freedom. The gimbal 16 is a mechanism having a structure in which three axes of yaw, roll and pitch are orthogonal to one another and cross at one point, which is arranged so that the intersection corresponds to the fingertip contact point. A roll axis at the tip of the mechanism of the gimbal 16 is assembled coaxially with the fingertip contact point feedback shaft 15. The orientation of the fingertip can be changed around the fingertip contact point, therefore, there is no offset between a contact point and a point of action when a force sense is given through the fingerstall 11, which is different from the case in which the contact point of the fingertip is fixed, and unnecessary moment is not generated. Since the odd feeling on operation is not given to the operator, fatigue of the operator can be reduced.

Four degrees of freedom which are the basic 3 degree-of-freedom drive system 12 driving the serial-link type arm and the fingertip contact point drive shaft 13 are the active degrees of freedom, and three degrees of freedom which are 3 degree-of-freedom of the gimbal including yaw, roll (coaxial with the fingertip contact point feedback shaft 15) and pitch are the passive degrees of freedom. That is, as compared with the case in which actuators are mounted on all axes for feeding back the force sense of 3 degree-of-freedom translation as well as 3 degree-of-freedom rotation (as described above), the active degree of freedom for one finger per one unit can be saved, therefore, the mechanism is simplified and device design is easily performed as well as weight in the vicinity of the fingertip is reduced. When a multi-finger type force/tactile feedback device is formed by combining units for respective fingers, interference between adjacent fingertips is not liable to occur when the operator performs operation, which expands a movable range.

It is necessary that the unit 10 appropriately has a mechanism as an additional function, which does not allow the orientation of the fingertip contact point feedback shaft 15 and the gimbal 16 to be changed with respect to a global coordinate system regardless of the orientation of the arm formed by the basic 3 degree-of-freedom system 12, that is, an orientation holding degree of freedom.

Figure 3A:
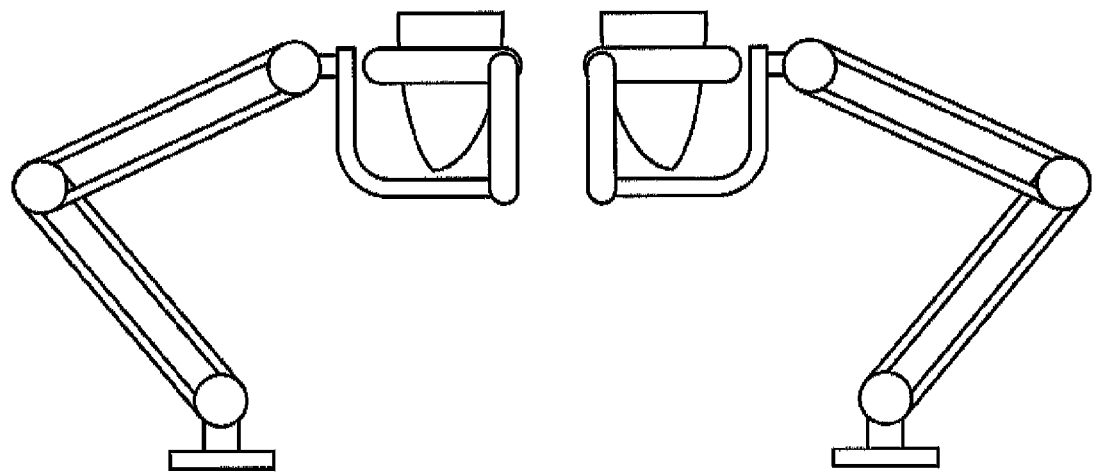
FIG. 3A is a view showing an operation example of units in the case that a fingertip contact point feedback shaft and a gimbal do not have an orientation holding degree of freedom.
Figure 3B:
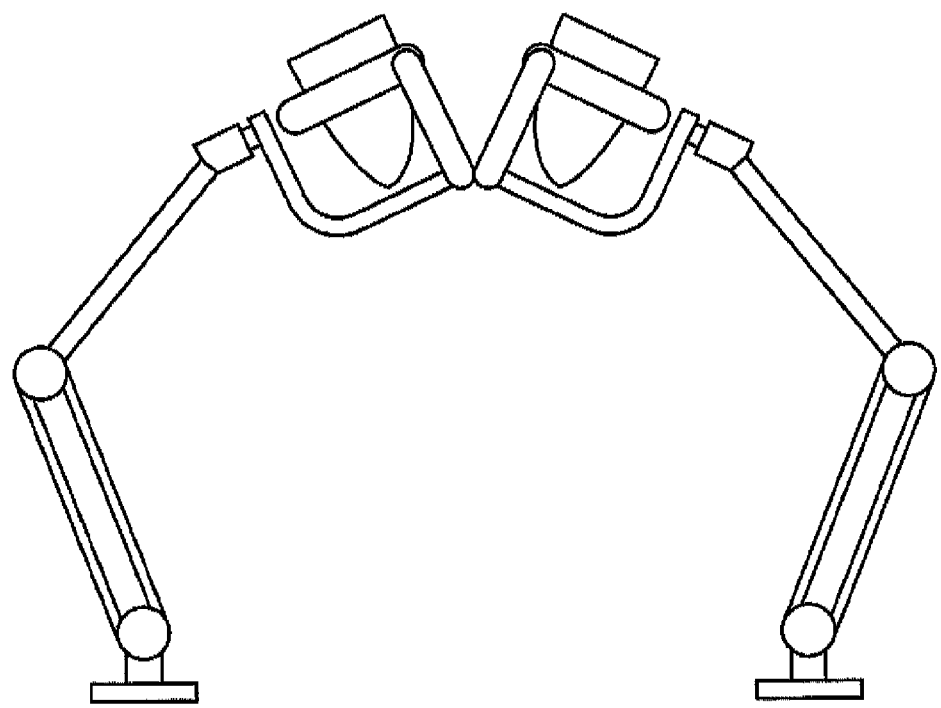
FIG. 3B is a view showing an operation example of units in the case that the fingertip contact point feedback shaft and the gimbal do not have the orientation holding degree of freedom.

FIG. 3A and FIG. 3B show an operation example in a case that two units 10 for two fingers are opposed. In respective drawings, an operation example of the units 10 in the case that the units do not have the orientation holding degree of freedom of the fingertip contact point feedback shafts 15 and the gimbals 16 is shown. That is, when the arms move from the initial orientation shown in FIG. 3A to another orientation, the orientation of the fingertip contact point feedback shafts 15 and the gimbals 16 changes with respect to the global coordinate system. Here, in the case that the multi-finger type force/tactile feedback device is formed by combining units for respective fingers, there is a fear that gimbals 16 interfere with each other as shown in FIG. 3B when the operation is performed while keeping the distance between respective fingers. In the case that a target object to be gripped (object to be fed back) is small, there is the probability that such problem occurs not infrequently.

Figure 4A:
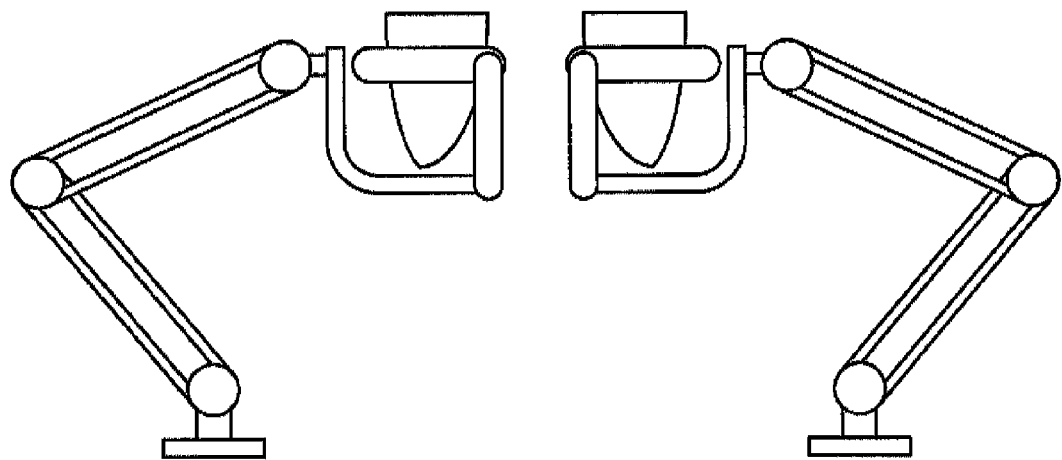
FIG. 4A is a view showing an operation example of units in the case that the fingertip contact points feedback shaft and the gimbal have the orientation holding degree of freedom.
Figure 4B:
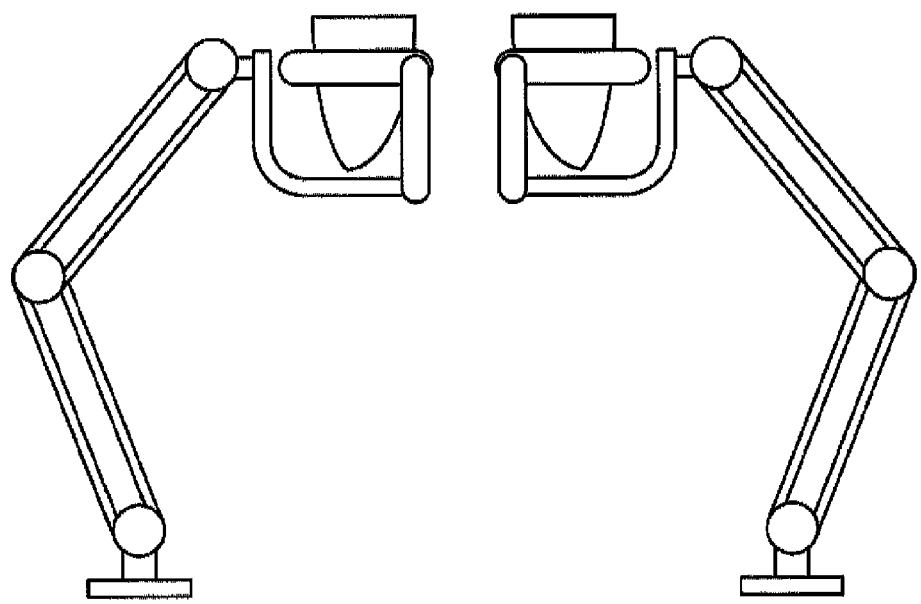
FIG. 4B is a view showing an operation example of units in the case that the fingertip contact point feedback shaft and the gimbal have the orientation holding degree of freedom.

Also, FIG. 4A and FIG. 4B show another example in the case that two units 10 for two fingers are opposed. In respective drawings, the operation example of the units 10 in the case that the units have the orientation holding degree of freedom of the fingertip contact point feedback shaft 15 and the gimbal 16 is shown. When the arms move from the initial orientation shown in FIG. 4A which is almost the same as the FIG. 3A to another orientation, the orientations of roots of the gimbals are maintained due to the orientation holding degree of freedom even when the operation is performed while keeping the distance between respective fingers as the above, therefore, the interference between adjacent units hardly occurs as shown in FIG. 4B, as a result, it is possible to expand a space in which respective units arranged to respective fingers can be operated.

The above orientation holding degree of freedom can be configured, for example, by using a mechanism equivalent to a parallel link for the arm as the basic 3 degree-of-freedom drive system. The parallel link can be manufactured by using pulleys having equal diameters and wire. In addition, a method of realizing the orientation holding degree of freedom by servomechanism using an actuator due to constraints on mechanism design and the like can be also considered.

Figure 5:
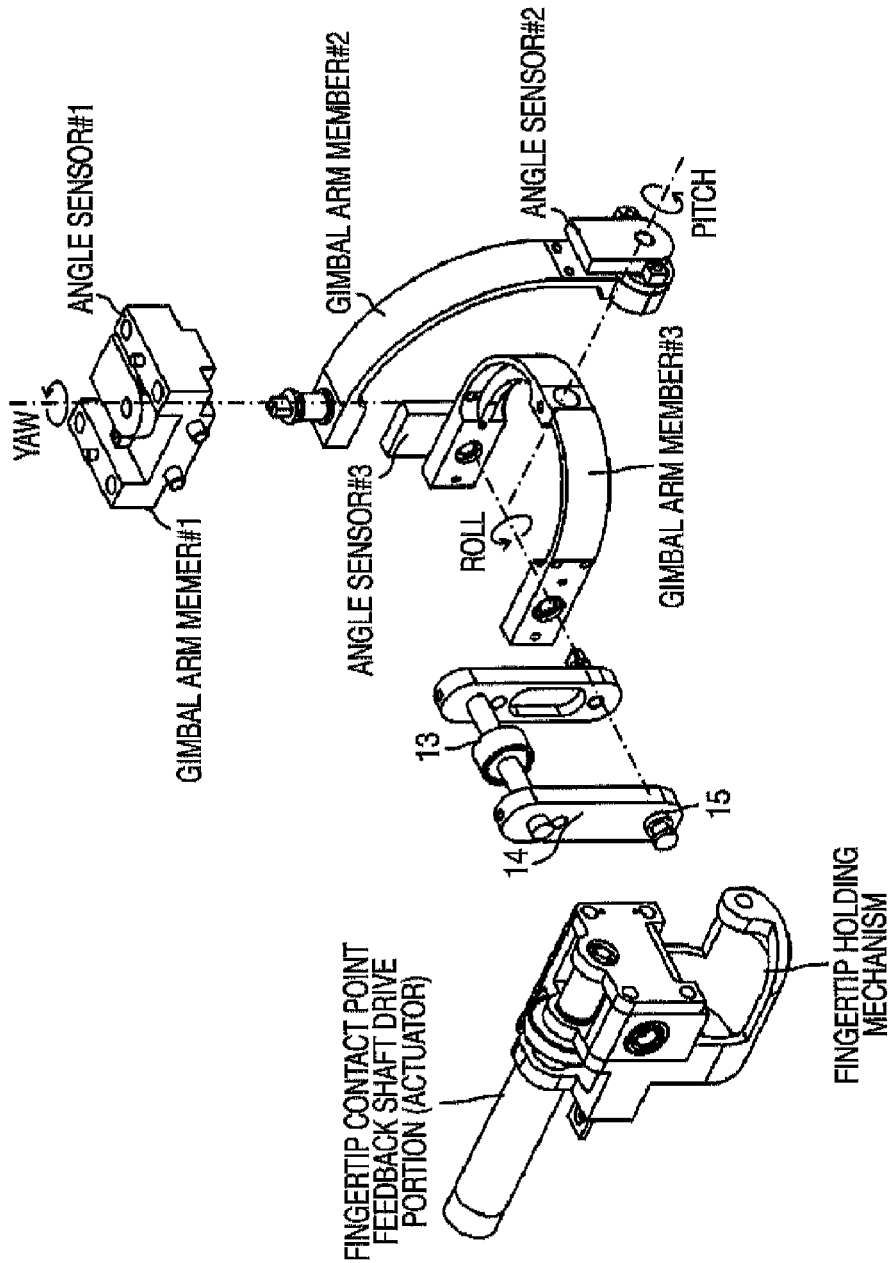
FIG. 5 is a view showing a design model at the periphery of a fingertip holding mechanism (corresponding to a portion attached to a tip of a basic 3 degree-of-freedom drive system in FIG. 1.
Figure 6:
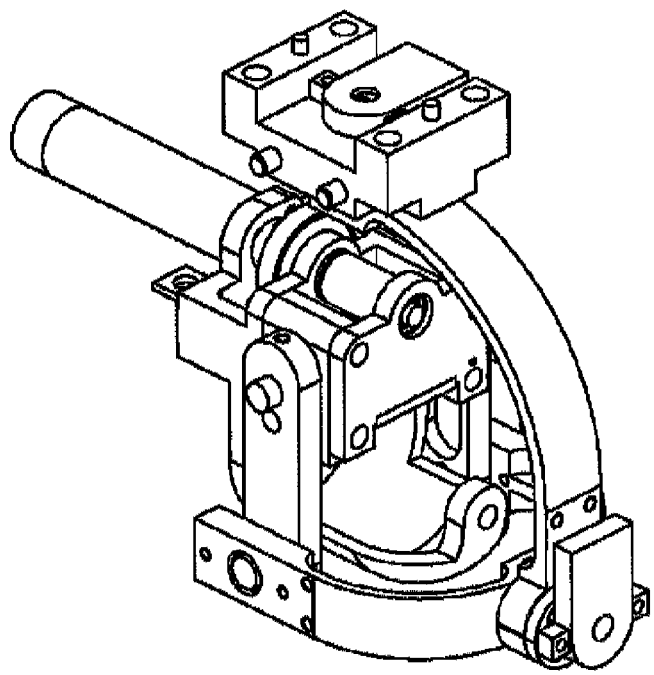
FIG. 6 is a view showing the design model at the periphery of the fingertip holding mechanism (corresponding to the portion attached to the tip of the basic 3 degree-of-freedom drive system in FIG. 1.
Figure 7:
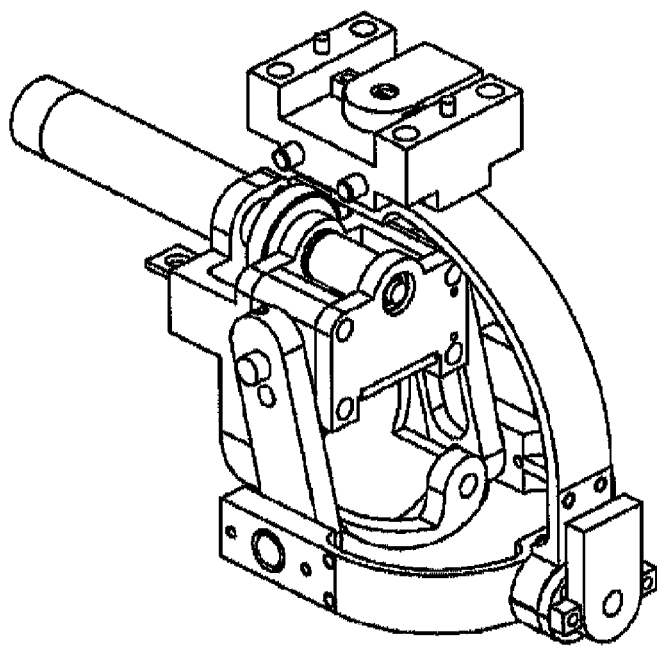
FIG. 7 is a view showing a state that the periphery of the fingertip holding mechanism shown in FIG. 5
Figure 8:
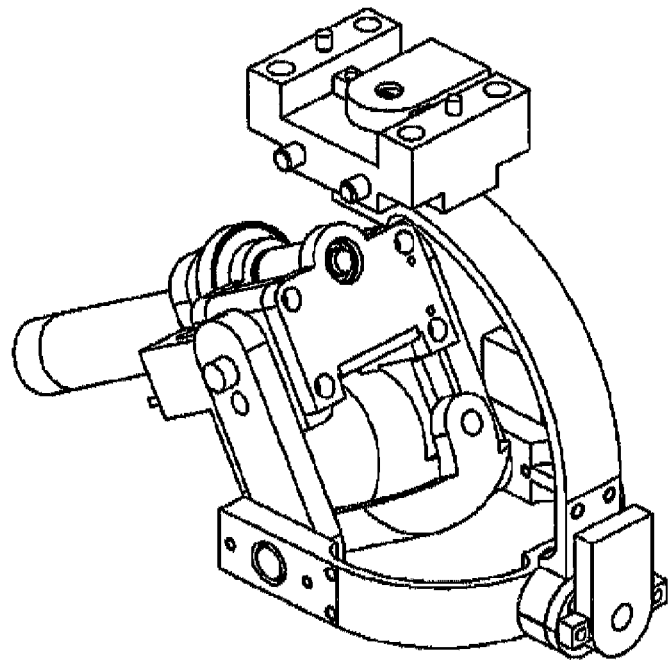
FIG. 8 is a view showing a state that the periphery of the fingertip holding mechanism shown in FIG. 5
Figure 9:
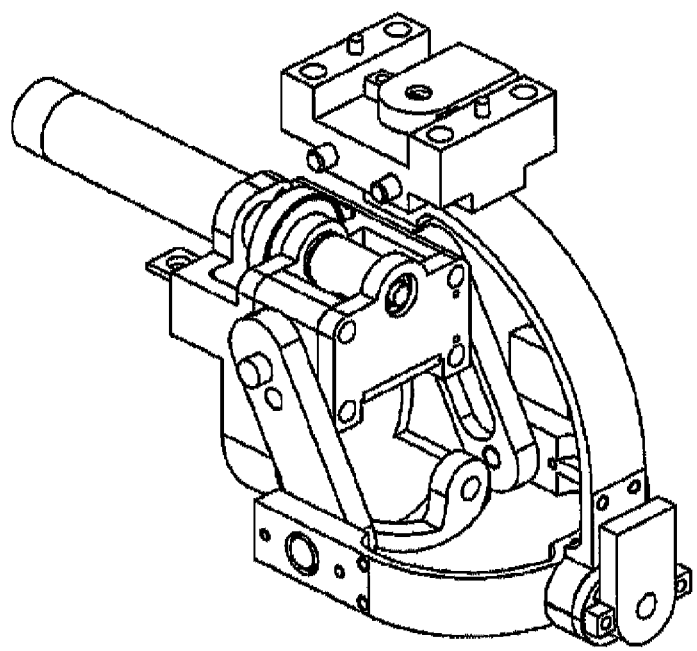
FIG. 9 is a view showing a state in which the periphery of the fingertip holding mechanism shown in FIG. 5
Figure 10:
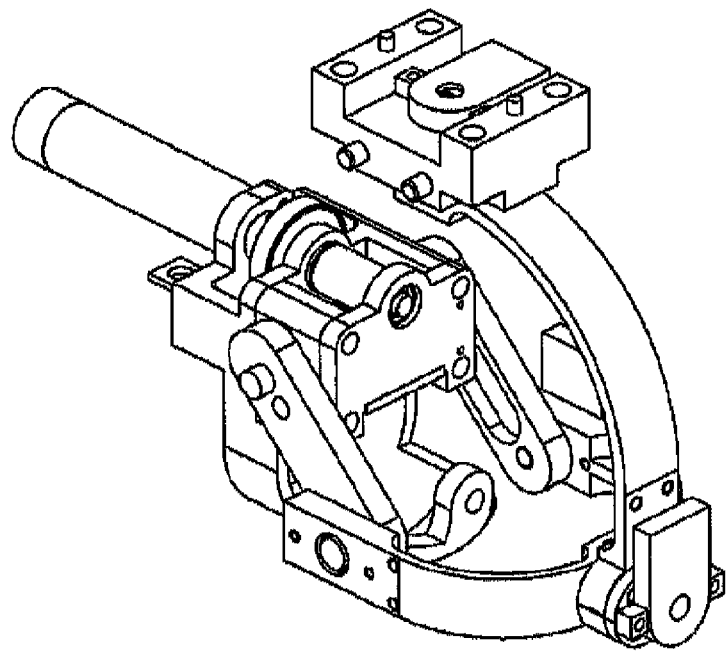
FIG. 10 is a view showing a state that the periphery of the fingertip holding mechanism shown in FIG. 5
Figure 11:
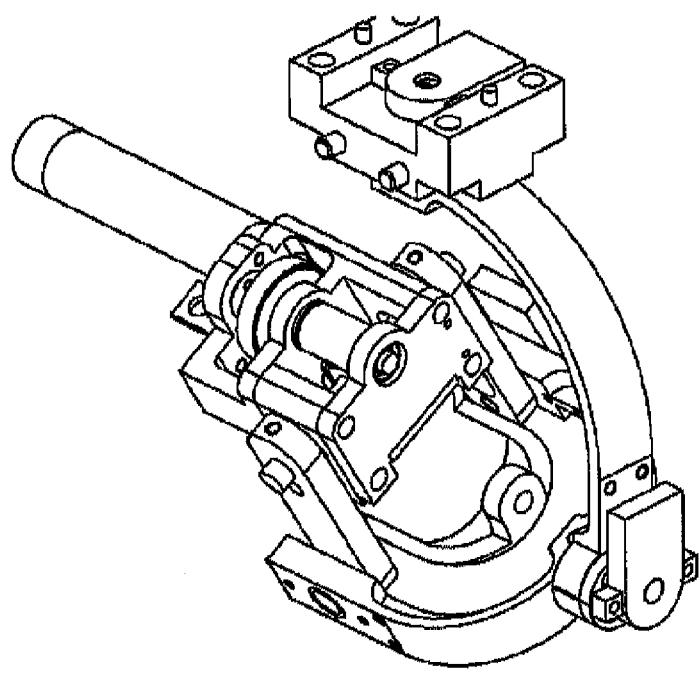
FIG. 11 is a view showing a state that the periphery of the fingertip holding mechanism shown in FIG. 5
Figure 12:
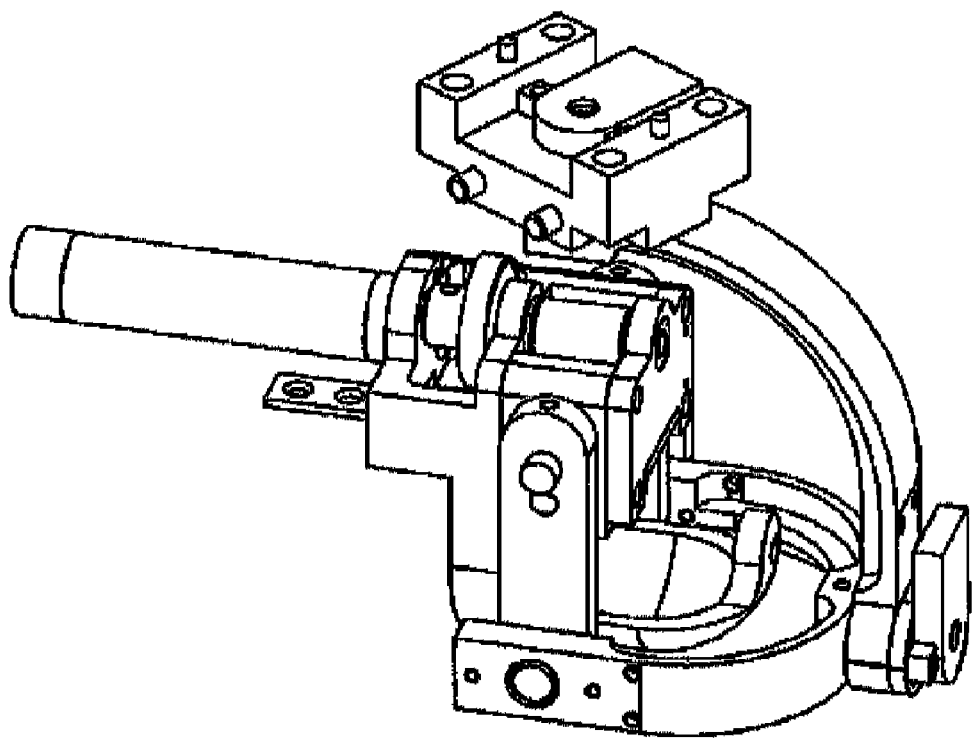
FIG. 12 is a view showing a state that the periphery of the fingertip holding mechanism shown in FIG. 5

A design model of a periphery of a fingertip holding mechanism (corresponding to a portion attached to a tip of the basic 3 degree-of-freedom drive system 12 in FIG. 1) is shown in FIG. 5 and FIG. 6. FIG. 5 is an exploded view and FIG. 6 is an assembly view.

The gimbal mechanism includes three gimbal arm members, which is assembled so that three axes of yaw, roll and pitch are orthogonal to one another and cross one another at a point.

The fingerstall 11 which is not shown is installed at the fingertip holding mechanism. The fingertip contact point moves along the surface of the ball of the finger while abutting thereon by pivoting movement of the small arm 14 about the fingertip contact point drive shaft by the driving of the fingertip contact point drive shaft 13. An angle sensor measuring an angle of each axis is provided at each gimbal arm, which can measure the orientation of the fingertip contact point.

A roll axis at the mechanism tip of the gimbal 16 is coaxial with the fingertip contact point feedback shaft 15, therefore, there is no offset between the fingertip contact point and the point of action giving a force sense and unnecessary moment is not generated when the orientation of the fingertip is changed around the fingertip contact point. Accordingly, the odd feeling on operation is not given to the operator, as a result, unnecessary fatigue is not given to the operator.

For reference, states in which the periphery of fingertip holding mechanism operates shown in FIG. 5 and FIG. 6 is operated are shown in FIG. 7 to FIG. 12.

Figure 13:
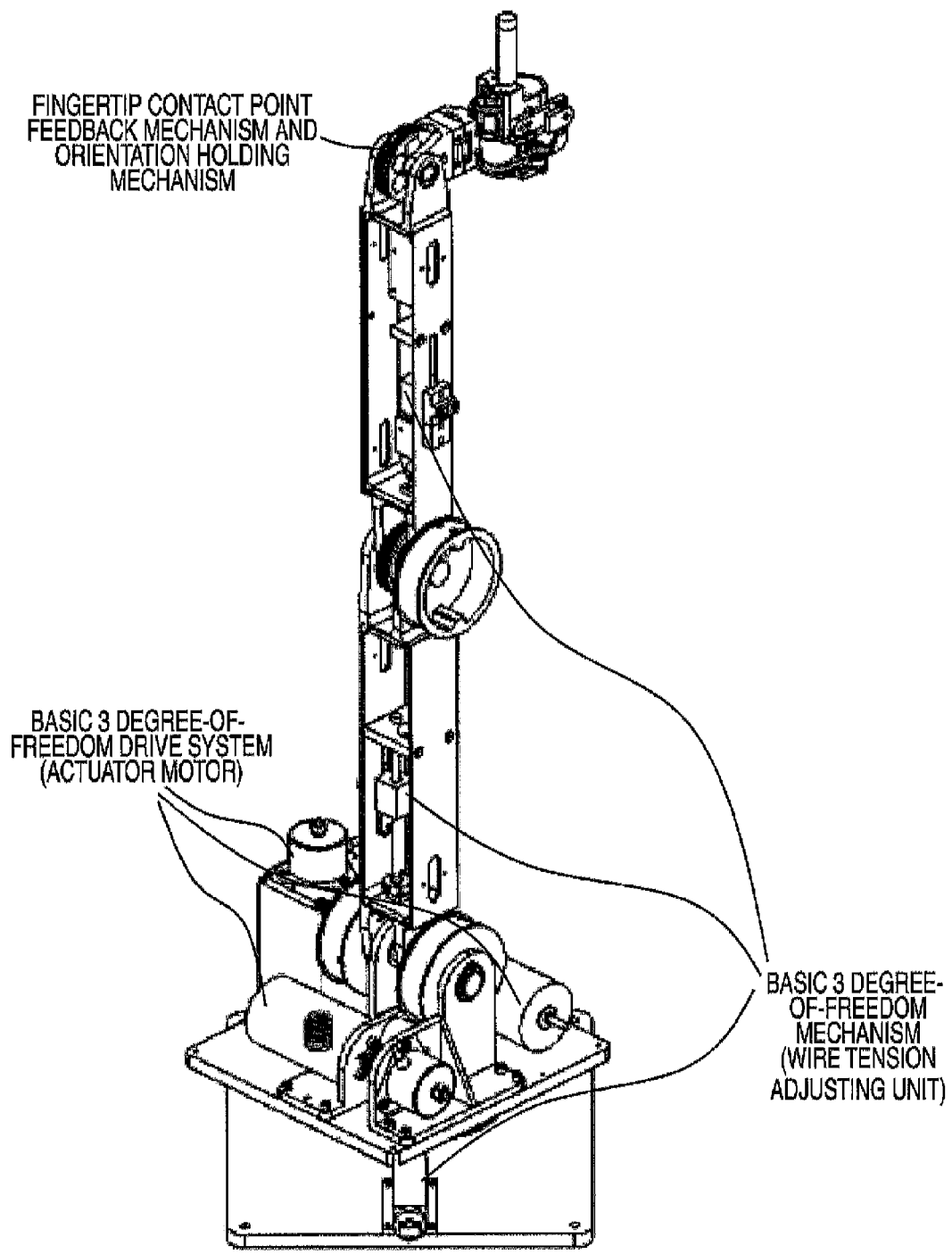
FIG. 13 is a design model of the whole one unit for one finger.
Figure 14:
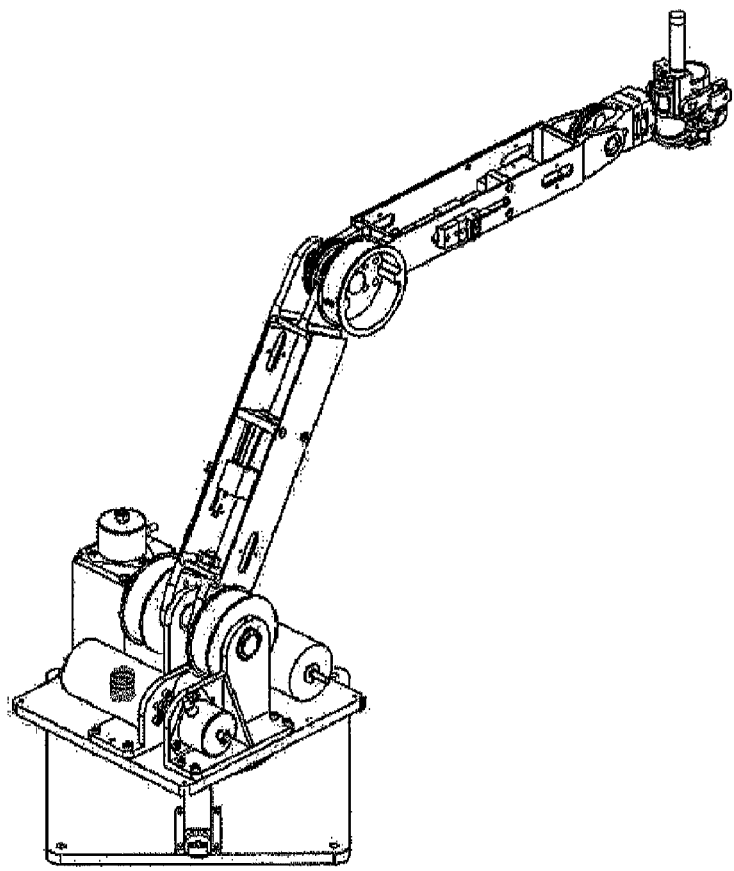
FIG. 14 is a view showing a state in which the unit shown in FIG. 13 is operated.
Figure 15:
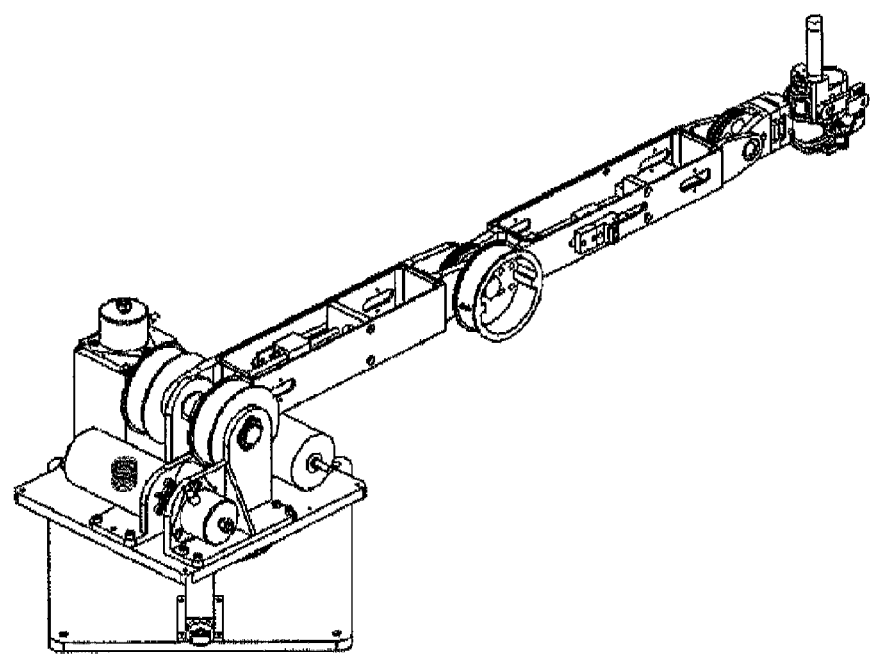
FIG. 15 is a view showing a state in which the unit shown in FIG. 13 is operated.
Figure 16:
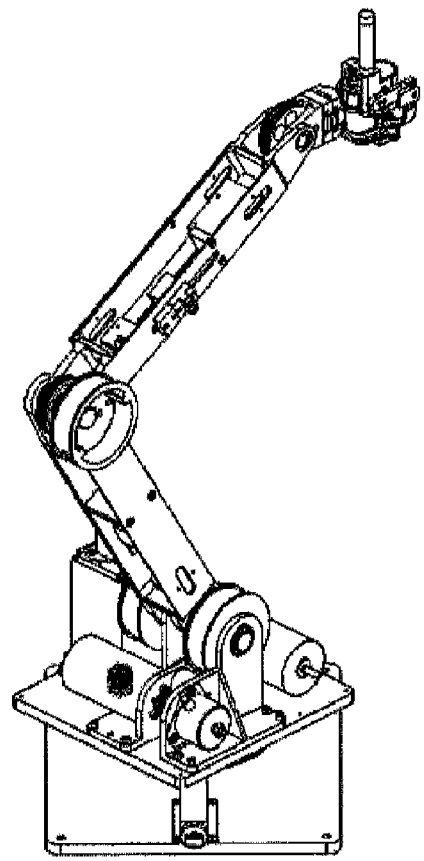
FIG. 16 is a view showing a state in which the unit shown in FIG. 13 is operated.
Figure 17:
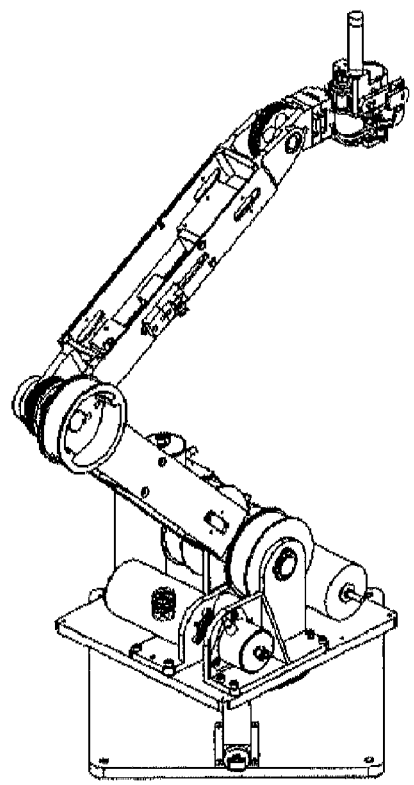
FIG. 17 is a view showing a state in which the unit shown in FIG. 13 is operated.
Figure 18:
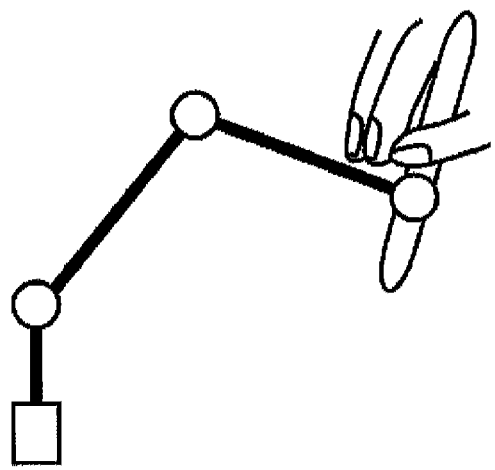
FIG. 18 is a view showing a structural example of a pen-type haptic device using a serial link.
Figure 19:
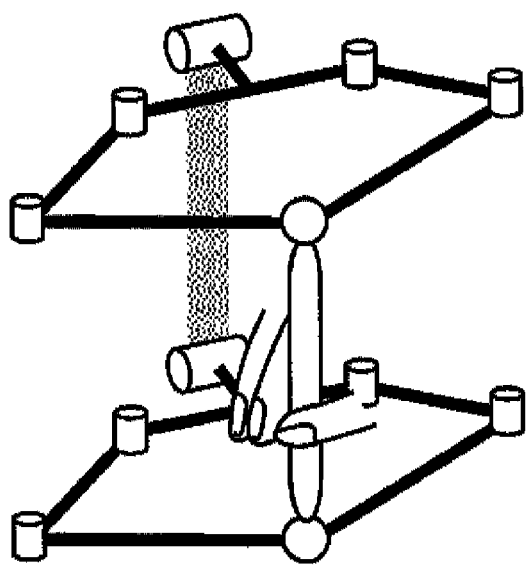
FIG. 19 is a view showing a structural example of a haptic device which feeds back 3-axial force to 6-axial force moment by using a parallel link structure.
Figure 20:
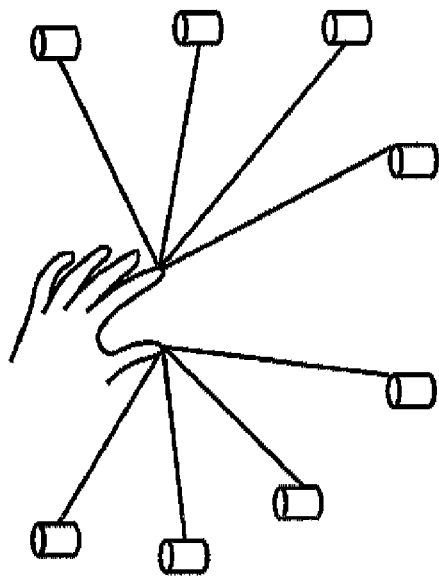
FIG. 20 is a view showing a structural example of a haptic device in which fingers and remote motors are connected by wire and force is applied through the wire.
Figure 21:
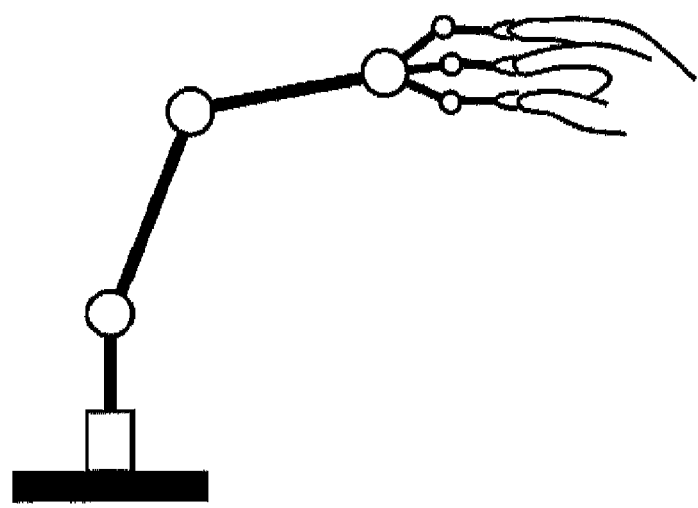
FIG. 21 is a view showing a structural example of a haptic device in which a hand-type force feedback mechanism to an opposed manipulator.

FIG. 13 shows a design model of the whole unit for one finger. In the shown example, the basic 3 degree-of-freedom drive system is formed in the serial-arm type.

In order to reduce inertia of respective links as much as possible, respective actuator motors realizing the active degrees of freedom are arranged in the base side. In addition, a wire drive mechanism for reducing a backlash is applied.

For further reference, states in which the unit shown in FIG. 13 operates are shown in FIG. 14 to FIG. 17. The unit shown in FIG. 13 has the orientation holding degree of freedom by configuring the arm as the basic 3 degree-of-freedom drive system by using a mechanism equivalent to the parallel link. Therefore, when the arm moves from the initial orientation shown in FIG. 13 to various orientations shown in FIG. 14 to FIG. 17, the orientation of the root of the gimbal is maintained due to the orientation holding degree of freedom.

As already described, the force/tactile feedback device according to the embodiment includes a serial-link type arm of the basic 3 degrees of freedom drive system as the position feedback unit. The serial-link type arm is supported by a given base at the root portion of an end as shown in FIG. 1. The serial-link type arm has three active degrees of freedom, suppressing autointerference or the moment of inertia of the driving portion itself by arranging respective actuators for realizing active degrees of freedom at the root portion of the serial link in a concentrated manner as shown in FIG. 13.

Also in the embodiment, power generated by respective actuators arranged at the root portion is transmitted to a corresponding joint with little loss along the way by using a wire/pulley type power transmission unit.

Figure 22A:
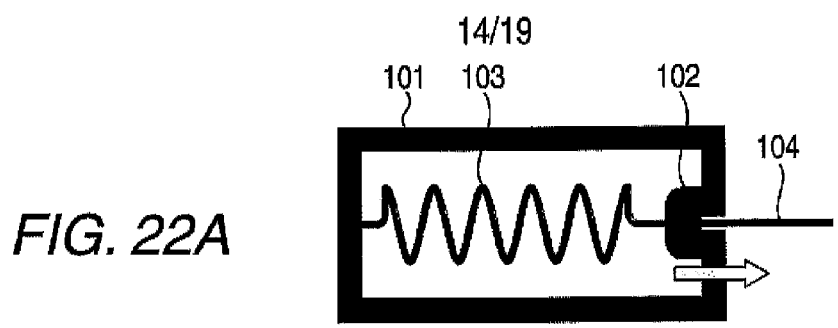
FIG. 22A is a view showing a structural example of a wire tension adjustment mechanism.
Figure 22B:
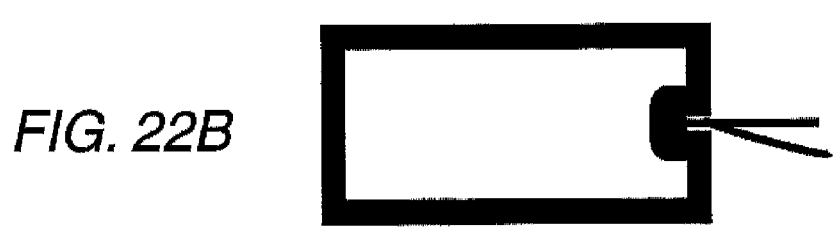
FIG. 22B is a view showing a structural example of a wire tension adjustment mechanism.
Figure 22C:
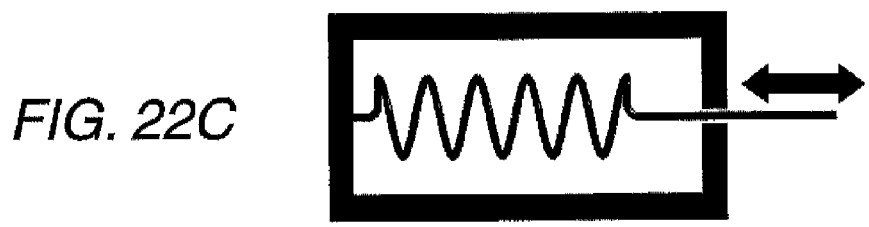
FIG. 22C is a view showing a structural example of a wire tension adjustment mechanism.

In this case, it is preferable that a wire tension adjustment unit is provided for maintaining the sufficient tension of wire. FIG. 22A to FIG. 22C show structural examples of the wire tension adjustment unit. In FIG. 22A, a reference numeral 101 denotes a fixing portion, a reference numeral 102 denotes a stopper, a reference numeral 103 denotes a spring, in which an end of the spring 103 is connected to a wire 104 and the stopper 102 is fixed to the wire 104.

FIG. 22B shows a state in which the spring 103 is not installed in the wire tension adjustment unit. In this case, the wire 104 is slackened all the time. On the other hand, when the wire 104 is connected to one end of the spring 103 the other end of which is fixed at the bottom of the fixing portion 101, the tension in the direction of pulling the wire 104 into the fixing portion 101 is added to the wire 104 due to restoring force of the spring 103, therefore, the wire 104 is not slackened.

Though the wire 104 is not slackened here, there is a fear that the wire 104 itself expands/contracts according to the effect of the spring 103 (an arrow in FIG. 22C). In response to this, the tension is maintained by the spring 103 when the wire 104 is slackened, and expansion/contraction of the spring 103 itself are suppressed by the stopper 102.

Since the stopper 102 generates a gap with respect to the fixing portion 101, the operator can visually detect that the wire 104 is slackened when the wire 104 is slackened. As shown by an arrow in FIG. 22A, when the stopper 102 has a one-way clutch structure in which the stopper 102 operates in the direction of the wire 104, the effect by the expansion/contraction of the spring 103 itself can be further suppressed.

Figure 23:
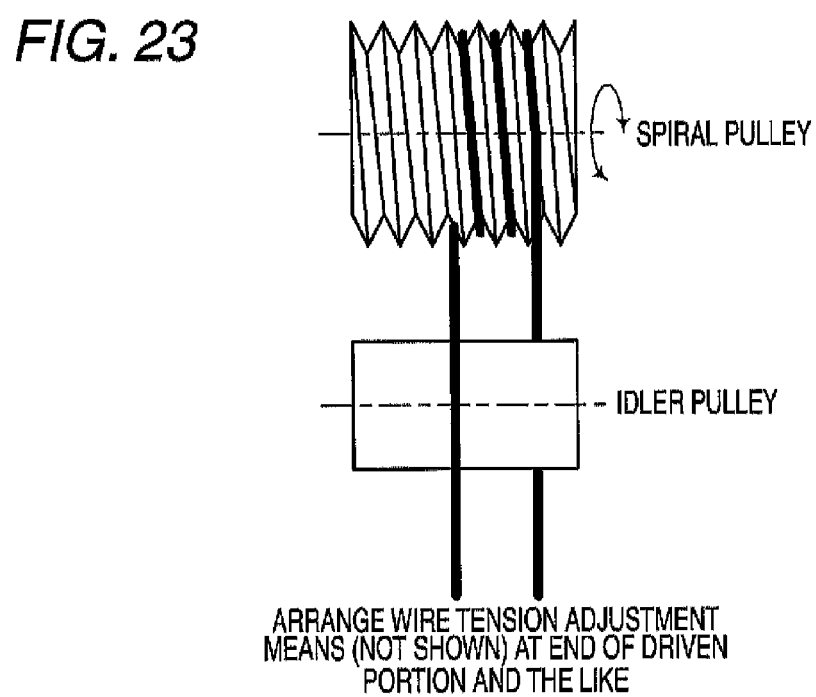
FIG. 23 is a view showing a structural example of a drive portion using a spiral pulley.

Additionally, it is also preferable that a spiral pulley is applied at a basic drive system drive portion, namely, a joint which is a transmission destination of power by the power transmission unit. The spiral pulley is a mechanism component in which grooves having cross-section of approximately V-shape are formed spirally, and wire is wound on the pulley plural times so as to fit into the V-grooves to some degree, thereby increasing the tension in the basic drive system drive portion and reducing the backlash, as a result, transmission of sufficient drive torque can be realized. In addition, it is possible to secure the number of winding turns of wire with saved space by using the spiral pulley. FIG. 23 shows a structural example of a drive portion using the spiral pulley. In the drawing, an idler pulley is appropriately arranged, however, the idler pulley is not an indispensable component in the embodiment of the invention.

According to the drive system using the spiral pulley, necessary initial tension is added to the wire, therefore, sufficient transmission torque is generated. Conversely, when the initial tension of the wire is insufficient, frictional force in the V-grooves is extremely reduced and relative motion is generated between the wire and the spiral pulley, then, the wire may be dropped from an end of the spiral. In order to prevent the dropout of the wire, the wire tension adjustment unit as shown in FIG. 22A will be indispensable.

Concerning the mechanism using the spiral pulley, for example, refer to "Consideration of a new wire drive system" attributed to HIROSE Shigeo, UCHIDA Yasuyuki, and Richard Chu (Robotics/Mechatronics lecture meeting '98 Lecture Collected Papers, 1C12-3 (1-2) (1998)).

In addition, it is also preferable that a wire coupled drive mechanism which coupled-driving plural joints by plural actuators is applied for driving the basic 3 degrees of freedom drive system. In a wire coupled drive system, an end of each wire is wound about a pulley united with a joint portion of a link member forming the arm as well as the other end thereof is fixed at an output shaft of an actuator. The wire for driving a link member at the tip side connects a joint portion to the output shaft of an actuator through a joint pulley at the root side.

Figure 24:
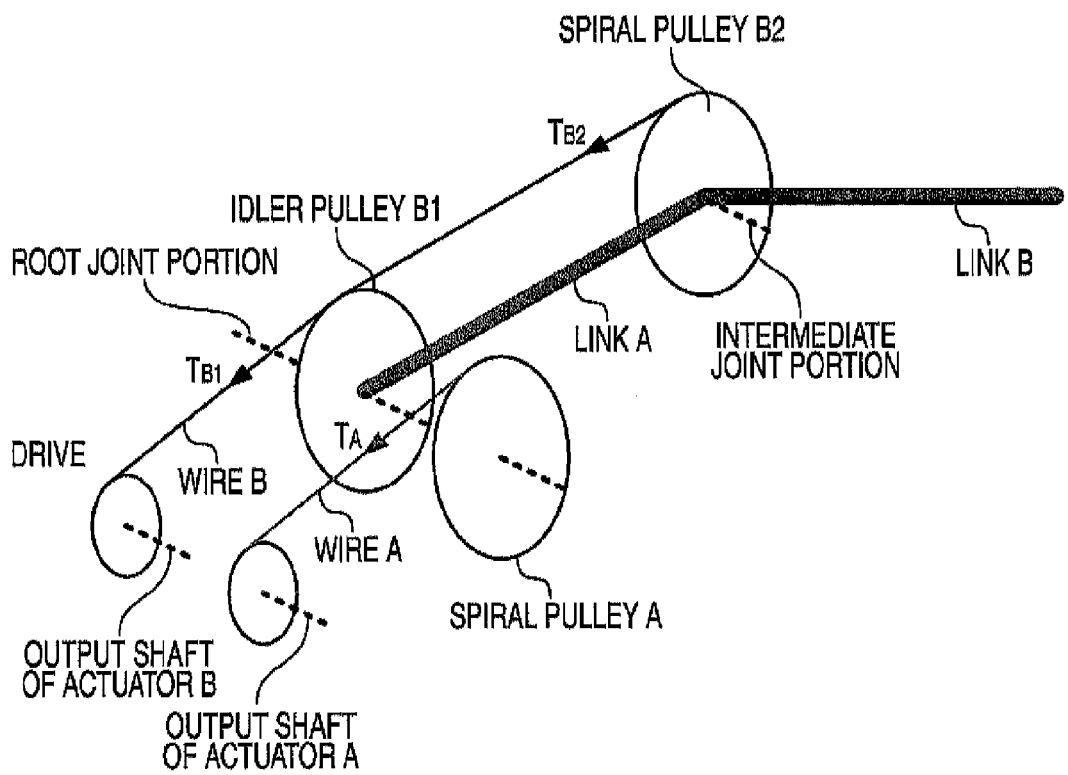
FIG. 24 is a view showing a structural example of a power transmission means according to a wire coupled drive system.

FIG. 24 shows a structural example of a power transmission unit according to the wire coupled drive system. In the shown example, a link mechanism including a root joint and an intermediate joint is considered, in which actuators A and B for driving respective joints are arranged at the root portion in a concentrated manner. At the root joint, a wire A which is coupled with an output shaft of the actuator A is wound around a spiral pulley A which fixes a link A. The other end of the wire B which is coupled with an output shaft of the actuator B is wound around a spiral pulley B2 which fixes a link B at the intermediate joint through an idler pulley B1 arranged at the root joint.

To the intermediate joint portion, a tension $T_{B2}$ is added from the wire B wound around the spiral pulley B2, which will be torque driving the tip link B. On the other hand, to the root joint portion, in addition to a tension $T_A$ received from the wire A wound around the spiral pulley A, a tension $T_{B1}$ received from the wire B wound around the idler pulley B1 is also added, as a result, $T_A+T_{B1}$ will be the torque driving the root link A.

The wire coupled driving is a power transmission unit which can give large torque to the joint link at the root side. In other words, the actuator of the drive portion whose output is small is sufficient, and generally, a drive system having small inertia and excellent response can be realized.

The present inventors consider that the wire coupled drive system is effective concerning driving of the intermediate joint of the arm when designing the haptic device such as the force/tactile feedback device shown in FIG. 1. Because it is preferable an actuator motor which is a heavy load is not arranged at the intermediate joint if possible.

Concerning the coupled drive system, refer to "Coupled drive of multi degree-of-freedom robot" attributed to HIROSE Shigeo, SATO Mikio (Journal of the Robotics Society of Japan, 7, 2, 128-135 (1989)) or "Development of wire-coupled drive type multi-joints manipulator" attributed to HIROSE Shigeo, MA Shokon (Collected papers of the Society of Instrument and Control Engineering, 26, 11, 1291-1298 (1990)).

In the drive system to which the above wire coupled drive system is applied, it is preferable that a coupling method of wire, namely, a method of straining respective wires is appropriately changed according to the arrangement of actuators for driving respective joints at the root portion of the arm. The point will be explained in detail hereinafter.

Figure 25:
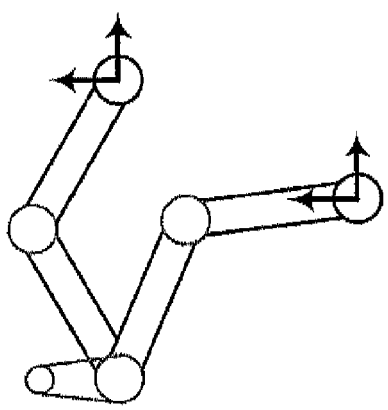
FIG. 25 is a view showing a state (change of orientation) in which a serial-link structure arm operates, which connects links at a root joint portion and an intermediate connection portion respectively.

In this case, an arm of the serial link structure is considered, in which links are connected at the root joint portion and at the intermediate joint portion respectively and a tip portion of the link mechanism is an end effector feeding back the force/tactile to the operator, as well as actuators for driving respective joint portions are arranged at the root portion in a concentrated manner. The two links connected at the intermediate joint has an approximately "dogleg" shape, and the orientation of the "dogleg" shape with respect to a floor surface (or the horizontal direction) at the root joint portion and an angle made by the "dogleg" shape at the intermediate joint portion is changed according to the driving of actuators (refer to FIG. 25).

In the serial link structure, it is necessary to apply force in the gravity support direction and the horizontal feedback direction in the end effector. In such case, it is necessary to generate intermediate-joint gravity support torque for supporting the link at the tip side in the direction going against the gravity at the intermediate joint portion. It is also necessary to generate root-joint gravity support torque for supporting the links from the root side in the direction going against the gravity at the root joint portion.

The direction of the intermediate-joint gravity support torque which is necessary at the intermediate joint portion is basically preferable to be torque around the axis of the intermediate joint for generating the force in the horizontal feedback direction. As shown by solid-line arrows in FIG. 26A, FIG. 26B, FIG. 27A and FIG. 27B, when the horizontal feedback direction is fixed, the direction of the intermediate-joint gravity support torque is also fixed (in the drawing, counterclockwise direction in space).

Figure 26A:
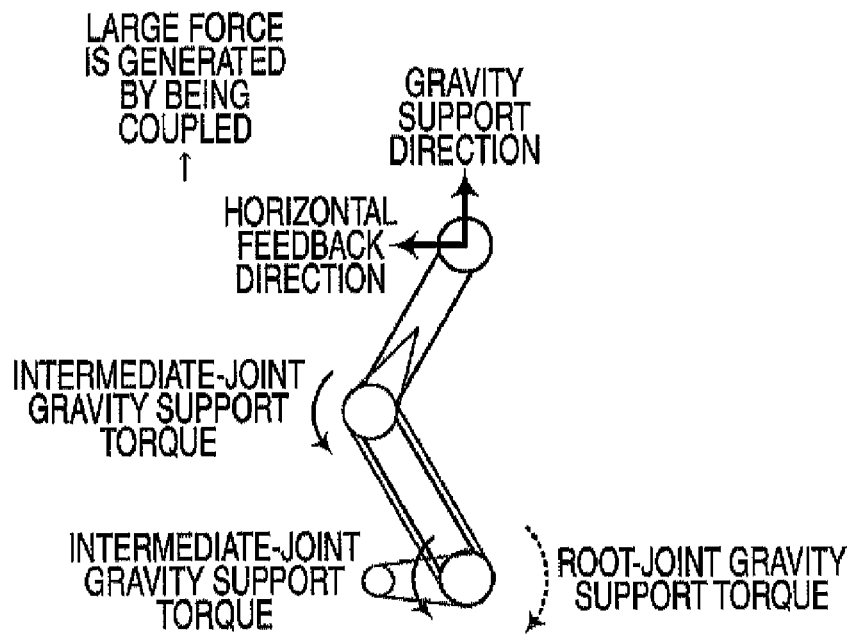
FIG. 26A is a view showing directions of torque applied to a root joint portion and an intermediate joint portion according to the orientation of a serial-link structure arm having a "dogleg"-shaped link when applying a straining method of coupling wire in which wire is wound in parallel so as not to be crossed between the root joint portion and the intermediate joint portion.
Figure 26B:
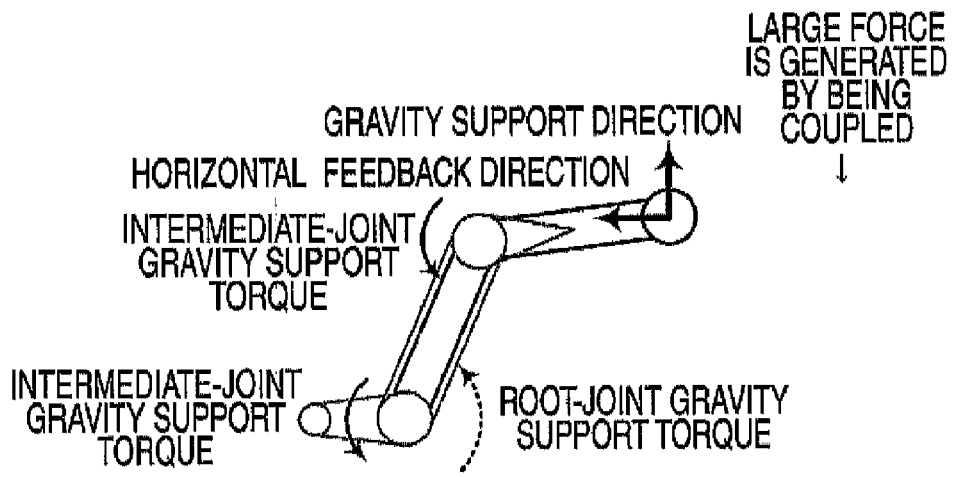
FIG. 26B is a view showing directions of torque applied to the root joint portion and the intermediate joint portion according to the orientation of the serial-link structure arm having the "dogleg"-shaped link when applying the straining method of coupling wire in which wire is wound in parallel so as not to be crossed between the root joint portion and the intermediate joint portion.
Figure 27A:
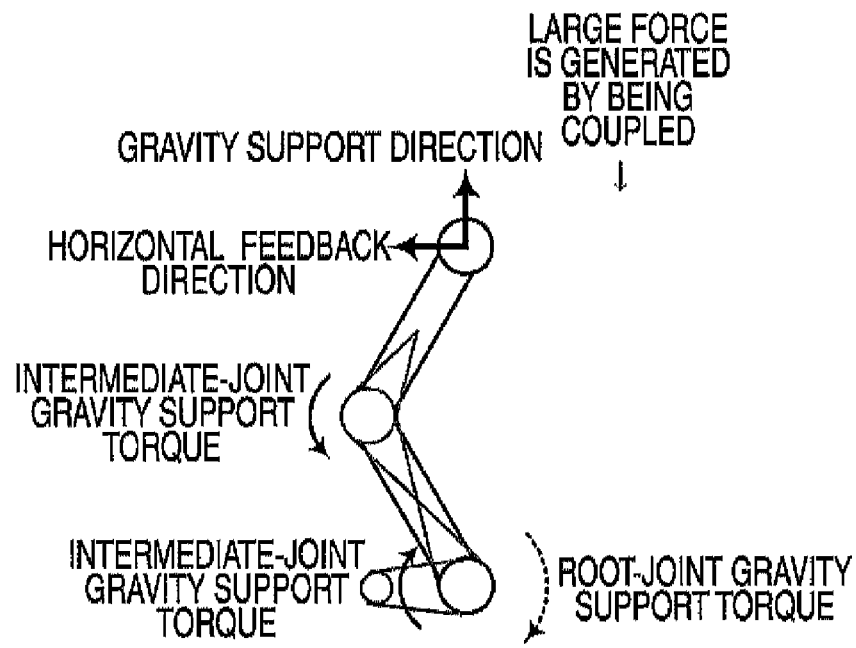
FIG. 27A is a view showing directions of torque applied to the root joint portion and the intermediate joint portion according to the orientation of the serial-link structure arm having the "dogleg"-shaped link when applying the straining method of coupling wire in which wire is wound so as to be crossed between the root joint portion and the intermediate joint portion.

On the other hand, the direction of the root-joint gravity support torque which is necessary at the root joint portion is preferable to be torque inverted according to the orientation of the serial-link structure arm, which is torque around the axis of the root joint for generating force going against the gravity generated at the gravity position of the arm, specifically, when the gravity acting on the gravity position of the arm is counterclockwise torque with respect to the root joint axis, the root-joint gravity support torque is clockwise as shown by dotted-line arrows in FIG. 26A and FIG. 27A. In the case that the gravity acting on the gravity position of the arm is clockwise torque with respect to the root joint axis, the root-joint gravity support torque is counterclockwise as shown by dotted-line arrows in the FIG. 26B and FIG. 27B.

Furthermore, when the above wire coupled drive system is applied, the intermediated joint gravity support torque is coupled with the root joint portion. The direction in which the intermediated joint gravity support torque coupled with the root joint portion acts differs according to the straining method of coupling wire at the root joint portion and the intermediated joint portion. The direction in which the root-joint gravity support torque acts at the root joint portion is switched according to the orientation of the arm, therefore, at the root joint portion, the intermediate-joint gravity support torque and the root-joint gravity support torque will be the same direction or opposite directions according to the straining method of the coupling wire and the orientation of the arm.

The method of straining the wire in this case is broadly classified into a straining method in which the wire is wound in parallel so as not to be crossed between the root joint portion and the intermediate portion (or a straining method of coupling wire in which rotation directions of joint axes are normal at the root joint portion and the intermediate joint portion) and a straining method in which the coupling wire is wound so as to be crossed at the root joint portion and the intermediate portion (or a straining method of coupling wire in which rotation directions of joint axes are inverse at the root joint portion and the intermediate joint portion).

First, the case of the straining method of coupling wire in which wire is wound in parallel so as not to be crossed between the root joint portion and the intermediate portion (or the straining method of coupling wire in which rotation directions of joint axes are normal at the root joint portion and the intermediate joint portion) will be considered.

When the gravity acting on the gravity position of the arm is the clockwise torque with respect to the root joint axis, the intermediate-joint gravity support torques acting at respective root joint portion and the intermediate joint portion are the same as shown in FIG. 26B. Therefore, the total torque of the intermediate-joint gravity support torque and the root-joint gravity support torque is added to the root joint portion due to the coupled effect, therefore, larger force can be obtained in the gravity support direction at the end effecter. Instead of that, force generated in the pulling direction is rather small.

On the other hand, when the gravity acting on the gravity position of the arm is the counterclockwise torque with respect to the root joint axis, the intermediate joint gravity support torques acting at respective root joint portion and the intermediate joint portion are opposite directions as shown in FIG. 26A. Therefore, the torque to be added to the root joint portion will be the difference between the intermediate-joint gravity support torque and the root-joint gravity support torque due to the coupled effect, as a result, obtained gravity support torque is reduced. However, in the state of orientation shown in FIG. 26A (the arm of "dogleg" shape is standing), required torque seems to be small, therefore, it is conceivable that there will be a problem on operation.

Subsequently, the case of the straining method of coupling wire in which wire is wound so as to be crossed between the root joint portion and the intermediate portion (or a straining method of coupling wire in which rotation directions of joint axes are inverse at the root joint portion and the intermediate joint portion) will be considered.

When the gravity acting on the gravity position of the arm is the counterclockwise torque with respect to the root joint axis, the intermediate joint gravity support torques acting at respective root joint portion and the intermediate joint portion are the same as shown in FIG. 27A, the total torque of the intermediate-joint gravity support torque and the root-joint gravity support torque is added to the root joint portion due to the coupled effect, therefore, larger force can be obtained in the gravity support direction at the end effecter. Instead of that, force generated in the pulling direction is rather small. However, when an orientation in which an angle made by the "dogleg" shape of the arm is sharper (namely, a state in which the arm is bent more deeply), the method may be effective because load of the drive torque is reduced as compared with the straining method in which wire is wound in parallel shown in FIG. 26A.

Figure 27B:
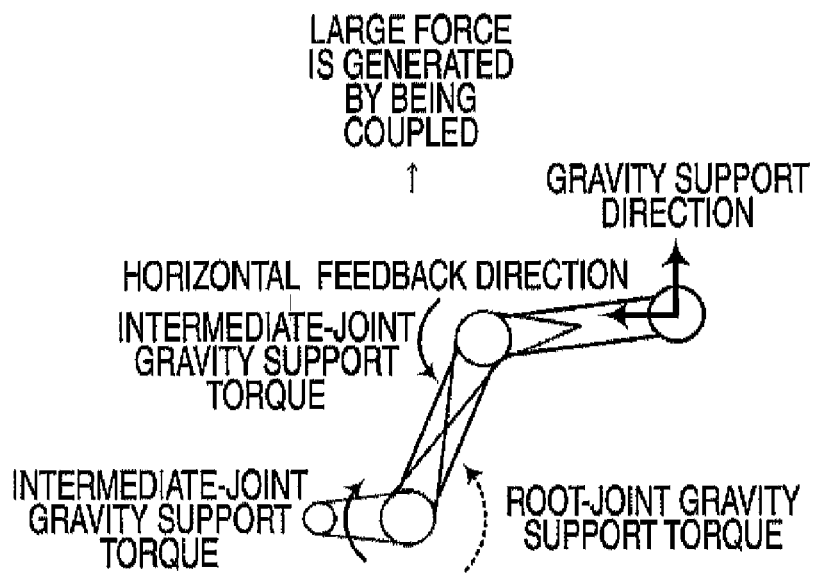
FIG. 27B is a view showing directions of torque applied to the root joint portion and the intermediate joint portion according to the orientation of the serial-link structure arm having the "dogleg"-shaped link when applying the straining method of coupling wire in which wire is wound so as to be crossed between the root joint portion and the intermediate joint portion.

On the other hand, when the gravity acting on the gravity position of the arm is the clockwise torque with respect to the root joint portion, the intermediate-joint gravity support torques acting at respective root joint portion and the intermediate joint portion are opposite directions as shown in FIG. 27B. Therefore, the torque to be added to the root joint portion will be the difference between the intermediate-joint gravity support torque and the root-joint gravity support torque due to the coupled effect, as a result, obtained gravity support torque is reduced. In the case that an orientation such that the "dogleg" shape of the arm is deeply inclined is used, it is necessary to consider the operating method including the straining method of coupling wire.

As described above, it is understandable that characteristics change according to the orientation of the arm and the straining method of coupling wire when the wire coupled drive system is applied to the serial-link type arm. In addition, it is necessary that the above characteristics are taken into consideration when plural numbers of units 10 are operated by being arranged adjacently for multi-fingers.

Figure 28A:
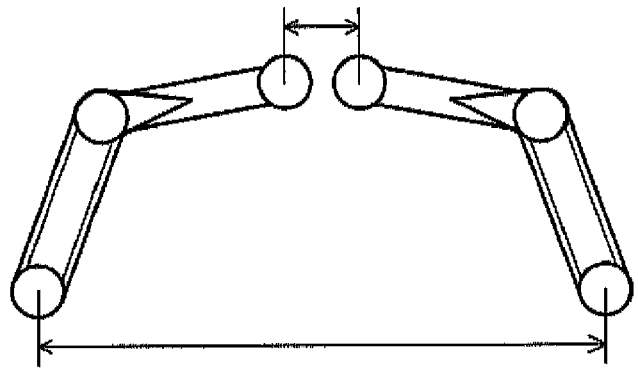
FIG. 28A is a view showing a state in which an interval between arm root portions of facing two units for two fingers is widely taken.
Figure 28B:
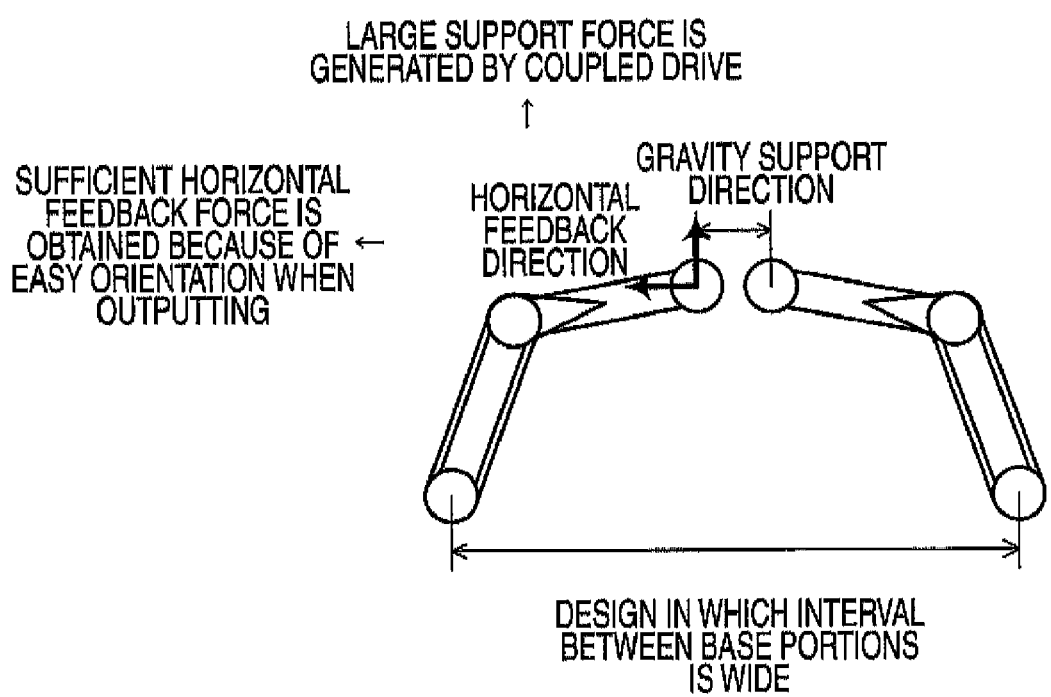
FIG. 28B is a view for explaining that the straining method of coupling wire in which the wire is wound in parallel so as not to be crossed between the root joint portion and the intermediate root portion is suitable when the interval between arm root portions of facing two units for two fingers is widely taken.

For example, when an interval between the opposed arm root portions of two units 10 for two fingers is widely taken (refer to FIG. 28A), it is conceivable that the straining method of coupling wire in which the wire is wound in parallel so as not to be crossed between the root joint portion and the intermediate portion is suitable. Because the drive system which is suitable for supporting the weight of respective arms whose orientations are in a slightly stretched state will be necessary (refer to FIG. 28B). In the case of the arrangement shown in FIG. 28A and FIG. 28B, there are advantages that a wide operation area can be obtained and excessive yaw movement at the arm root portion is small.

Figure 29A:
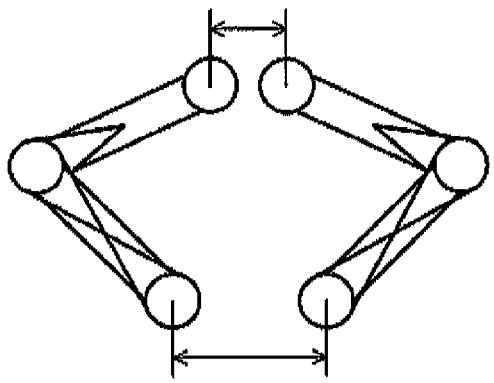
FIG. 29A is a view showing a state in which the interval between arm root portions of facing two units for two fingers is narrowly taken.
Figure 29B:
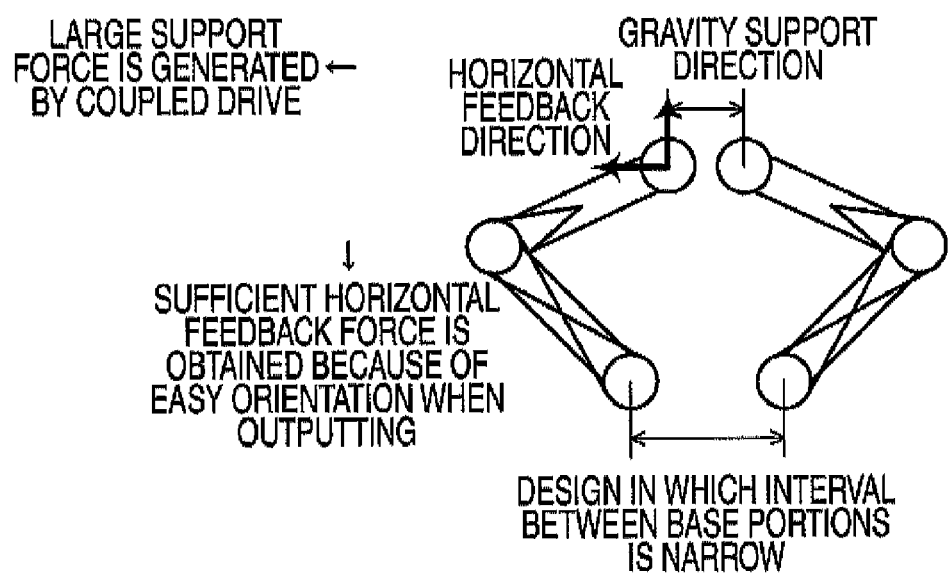
FIG. 29B is a view for explaining that the straining method of coupling wire in which the wire is wound so as to be crossed between the root joint portion and the intermediate root portion is suitable when the interval between arm root portions of facing two units for two fingers is narrowly taken.

For example, when the interval between the opposed arm root portions of two units 10 for two fingers is narrowly taken (refer to FIG. 29A), it is conceivable that the straining method of coupling wire in which the wire is wound so as to be crossed between the root joint portion and the intermediate portion is suitable. Because "dogleg" shapes of respective arms are in an orientation of being deeply bent as shown in FIG. 29B, and it is easy to support the weight of the arms themselves due to the orientation.

Lastly, principal characteristics of the force/tactile device according to the embodiment of the invention will be explained.

Change of a Contact Point Position can be Fed Back

In the force/tactile feedback device according to the embodiment of the invention, the change of the contact point at each finger can be fed back to the operator. For example, when grasping an object of approximately several mm to 20 mm, it is a "picking" motion, therefore, grasping is performed by fingertips in general. On the other hand, when the size of the target object is larger, it is a "grasping" motion, therefore, a contact point at the fingertip gradually moves from the tip to the ball of the finger (near the first joint).

Since the position of the fingertip contact point is fixed in most of the force/tactile feedback devices of related arts, a force sense is fed back to the fingertip contact point which does not change regardless of a state of grasping the target object, therefore, the operator sometimes feels odd. In response to this, the force/tactile feedback device according to an embodiment of the invention is capable of feeding back the fingertip contact point at a position which can be conceived by the operator according to the contact state of the target object, therefore, there are advantages that the odd feeling is reduced as well as characteristics of the target object can be perceived more intuitively.

Improvement of Controllability Due to the Simple Mechanism

In order to feed back a force sense and a tactile sense most exquisitely in the force/tactile feedback device in related art, it is necessary to feed back both three translation degrees of freedom and three rotation degrees of freedom. It is necessary to use actuators of six axes per one finger, and there is a problem that the device becomes complicated even design devices are performed and the weight (inertia moment) have to be increased.

In response to this, the force/tactile feedback device according to an embodiment of the invention can realize a simple mechanism in which the active degree of freedom is saved. Accordingly, the required output of actuators can be suppressed as well as improvement of controllability due to improvement of the transition characteristics can be expected.

Varied Targets to be Grasped by Securing Wide Moving Range (Work Area)

In the force/tactile feedback device according to an embodiment of the invention, a simple mechanism can be realized as well as further wider work space can be realized by holding the orientation of fingertips. Accordingly, selectivity of the orientation of respective fingers is improved and various object can be targets to be grasped. As a result, the force/tactile feedback device according to an embodiment of the invention can be applied to various industrial fields or technical fields.

Torque Around the Contact Point can be Artificially Perceived

When the operator perceives torque around the contact point, it is presumed that the rotation center is determined based on the force distribution at the contact surface of the fingertip except the case that each finger is twisted or the like. Accordingly, the force/tactile feedback device according to an embodiment of the invention uses a finger tip holding member having a fingerstall shape, therefore, only the rotation center have to be accurately fed back in actual fact, and the contact point position is fedback, whereby the operator feels as if he/she can perceive the torque as well as does not feel odd.

Perception of the Target Object Shape

When the operator touches a target object, a position of the initial contact point is estimated by the control side, whereby a sense at the moment of touch will be accurate. For example, in the case that the target object is a polyhedron, it is easy to perceive respective structural surfaces of the object, accordingly, it is easy to intuitively perceive the shape of the target object when being grasped.

INDUSTRIAL APPLICABILITY

The invention has been described in detail with reference to the specific embodiment. However, it should be understood by those skilled in the art that various modifications and alterations may occur insofar as they are within the scope of the gist of the invention.

The force/tactile feedback device according to the embodiment of the invention can be applied for feeding back a three-dimensional force sense or tactile sense to the user with respect to objects in environment which are difficult to be actually touched in various applications such as in learning of special skills such as medical care or the like, virtual environment such as microcosms or oceans, and remote operations in special or dangerous environment such as a nuclear reactor.

The force/tactile feedback device according to the embodiment of the invention feeds back a force sense to plural fingers, and the number of fingers to which the sense is fed back can be appropriately selected depending on the operation contents or applications. When an object to be gripped is small (picking motion), it is suitable that the mechanism itself is formed small, and the force sense can be fed back with two or three fingers. On the other hand, when an object to be gripped is larger (gripping motion), it is possible to feed back the shape, the size and the like more accurately when feeding back the force sense using fingers more than three.

In short, the invention has been disclosed in a form of exemplification, and the contents of description of the specification should not be taken in a limited manner. In order to judge the gist of the invention, claims should be taken into consideration.

What is claimed is:

1. A force/tactile feedback device feeding back a force sense to a finger, including a fingertip, of an operator comprising:
a fingerstall into which the fingertip of the operator is inserted;
a position feedback means for feeding back a position to the fingertip held by the fingerstall;
a fingertip contact point feedback means for feeding back a fingertip contact point to the fingertip held by the fingerstall, wherein the fingertip contact point feedback means is configured to move the fingertip contact point along the fingertip held by the fingerstall; and
an unnecessary moment removal means for supporting the fingertip contact point feedback means so as to limit generation of unnecessary moment at a tip portion of the position feedback means.

2. The force/tactile feedback device according to claim 1, wherein the position feedback means includes a serial-link type arm of a basic 3 degree-of-freedom drive system, wherein the fingertip contact-point feedback means includes a fingertip contact point drive shaft arranged on the fingerstall, a small arm of which an end is supported at the fingertip contact point drive shaft so as to pivot, and the fingertip contact point provided at an other end of the small arm, and
wherein the unnecessary moment removal means supports the small arm at a fingertip contact point feedback shaft so that the tip portion of the arm forming the position feedback means can pivot around the fingertip contact point.

3. The force/tactile feedback device according to claim 2, wherein the fingertip contact point drive shaft has an active fingertip contact-point feedback degree of freedom which is driven by an actuator, in which a fingertip contact point moves along a surface of a ball of the finger by pivoting movement of the small arm about the fingertip contact point drive shaft due to driving of the fingertip contact point drive shaft.

4. The force/tactile feedback device according to claim 2, wherein the unnecessary moment removal means is formed by a 3 degree-of-freedom gimbal which is arranged so that three axes of yaw, roll, and pitch are orthogonal to one another and cross at one point and an intersection corresponds to the fingertip contact point,
and wherein any one of 3 axes is coaxial with the fingertip contact point feedback shaft.

5. The force/tactile feedback device according to claim 1, wherein a structure including one group of the position feedback means, the fingertip contact point feedback means and the unnecessary moment removal means is one unit for one finger, and a multi-finger-type force/tactile feedback device is formed by combining multiple groups for respective fingers.

6. The force/tactile feedback device according to claim 2, further comprising:
an orientation holding degree of freedom which does not change the orientation with respect to the fingertip contact point feedback shaft and a global coordinate system of the gimbal regardless of the orientation of the arm.

7. The force/tactile feedback device according to claim 1, further comprising:
an angle sensor measuring an angle of each axis of the 3 degree-of-freedom gimbal.

8. The force/tactile feedback device according to claim 2, wherein each joint degree of freedom of the serial-link type arm of the basic 3 degree-of-freedom drive system included in the position feedback means has an active degree of freedom driven by an actuator.

9. The force/tactile feedback device according to claim 8, wherein the serial-link type arm is supported by a given base at a root portion of an end of the arm,
wherein actuators driving respective joints of the serial-link type arm are arranged at the root portion of the serial link in a concentrated manner, and the arm further includes a power transmission means transmitting power of respective actuators arranged at the root portion to a corresponding joint.

10. The force/tactile feedback device according to claim 9, wherein the power transmission means includes a wire pulley system, having a wire tension adjustment means adjusting tension of the wire.

11. The force/tactile feedback device according to claim 10, wherein a spiral pulley is used at a joint which is a transmission destination of power by the power transmission means.

12. The force/tactile feedback device according to claim 8, wherein the position feedback means includes a wire coupled drive mechanism which couple drives plural joints by plural actuators.

13. A force/tactile feedback device feeding back a force sense to a finger, including a fingertip, of an operator comprising:
- a 3 degree-of-freedom arm for position feedback;
- a 3 degree-of-freedom gimbal mechanism;
- a more than one degree-of-freedom fingertip portion holding mechanism into which the fingertip of the operator is inserted;
- a 1 degree-of-freedom arm for feeding back a fingertip contact point to the fingertip held by the fingertip portion holding mechanism, wherein the one degree-of-freedom arm is configured to move the fingertip contact point along the fingertip held by the fingertip portion holding mechanism.

14. A force/tactile feedback device feeding back a force sense to a finger, including a fingertip, of an operator comprising:
- a fingerstall into which the fingertip of the operator is inserted;
- a position feedback unit configured to feed back a position to the fingertip held by the fingerstall;
- a fingertip contact point feedback unit configured to feed back the fingertip contact point to the fingertip held by the fingerstall, wherein the fingertip contact point feedback unit is configured to move the fingertip contact point along the fingertip held by the fingerstall; and
- an unnecessary moment removal unit configured to support the fingertip contact point feedback unit so as to limit generation of unnecessary at a tip portion of the position feedback unit.

* * * * *